United States Patent
Chen et al.

(10) Patent No.: US 10,909,719 B2
(45) Date of Patent: Feb. 2, 2021

(54) IMAGE PROCESSING METHOD AND APPARATUS

(71) Applicant: Huawei Technologies Co., Ltd., Shenzhen (CN)

(72) Inventors: Xin Chen, Shenzhen (CN); Wenmei Gao, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 35 days.

(21) Appl. No.: 16/472,067

(22) PCT Filed: Dec. 21, 2016

(86) PCT No.: PCT/CN2016/111290
§ 371 (c)(1),
(2) Date: Jun. 20, 2019

(87) PCT Pub. No.: WO2018/112790
PCT Pub. Date: Jun. 28, 2018

(65) Prior Publication Data
US 2020/0098133 A1 Mar. 26, 2020

(51) Int. Cl.
*G06K 9/00* (2006.01)
*G06T 7/73* (2017.01)
(Continued)

(52) U.S. Cl.
CPC .............. *G06T 7/73* (2017.01); *G06T 7/33* (2017.01); *G06T 7/60* (2013.01); *H04N 5/23229* (2013.01)

(58) Field of Classification Search
CPC .... G06T 7/73; G06T 7/33; G06T 7/60; G06T 2207/30244; G06T 7/80; H04N 5/23229; H04N 1/387
See application file for complete search history.

(56) References Cited

U.S. PATENT DOCUMENTS 6,449,004 B1 * 9/2002 Okisu ............... H04N 5/217 348/44
6,449,397 B1 * 9/2002 Che-Chu ........... G06K 9/3283 358/474
(Continued)

FOREIGN PATENT DOCUMENTS

CN 1867940 A 11/2006
CN 1937698 A 3/2007
(Continued)

OTHER PUBLICATIONS

Zhang, Zhengyou, "Single-View Geometry of a Rectangle With Application to Whiteboard Image Rectification", CiteSeer, citeseerx.ist.psu.edu/viewdoc/summary?doi=10.1.1578.2050, Microsoft Research, 2013, 7 pages.

*Primary Examiner* — Aaron W Carter
(74) *Attorney, Agent, or Firm* — Slater Matsil, LLP

(57) ABSTRACT

An image processing method includes: detecting a first quadrangle in an image, where the first quadrangle includes four vertexes, the four vertexes correspond to four photographed points; determining distance information of the four photographed points relative to a camera capturing the image; determining locations of the four photographed points based on the distance information of the four photographed points and location information of the points on the image; and determining, based on the locations of the four photographed points, that the four photographed points are coplanar, where the four photographed points form a second quadrangle, determining a side ratio of two neighboring sides of the second quadrangle when a side angle and a side length relationship of the second quadrangle satisfy a preset condition, and correcting the first quadrangle to a rectangle, where two neighboring sides of the rectangle are in the side ratio.

18 Claims, 12 Drawing Sheets

(51) Int. Cl.
  *G06T 7/33* (2017.01)
  *G06T 7/60* (2017.01)
  *H04N 5/232* (2006.01)

(56) References Cited

U.S. PATENT DOCUMENTS

| | | | | |
|---|---|---|---|---|
| 6,877,864 | B1* | 4/2005 | Tamura | G09G 3/002 |
| | | | | 348/E5.137 |
| 7,171,056 | B2 | 1/2007 | Zhang et al. | |
| 7,268,803 | B1 | 9/2007 | Murata et al. | |
| 9,160,946 | B1* | 10/2015 | Semenov | H04N 5/23222 |
| 9,756,303 | B1* | 9/2017 | De La Cruz | H04N 9/3185 |
| 2003/0098957 | A1* | 5/2003 | Haldiman | G03B 21/005 |
| | | | | 353/69 |
| 2004/0150617 | A1* | 8/2004 | Tamura | H04N 9/3185 |
| | | | | 345/156 |
| 2005/0078192 | A1 | 4/2005 | Sakurai et al. | |
| 2009/0052800 | A1* | 2/2009 | Aso | G06T 3/4007 |
| | | | | 382/275 |
| 2009/0225180 | A1* | 9/2009 | Maruyama | G06T 7/12 |
| | | | | 348/222.1 |
| 2012/0050322 | A1* | 3/2012 | Sato | H04N 13/111 |
| | | | | 345/630 |
| 2012/0105813 | A1* | 5/2012 | Todoroki | H04N 9/3185 |
| | | | | 353/69 |
| 2013/0070122 | A1 | 3/2013 | Nijemcevic et al. | |
| 2014/0125819 | A1* | 5/2014 | Tokunaga | G06T 7/593 |
| | | | | 348/188 |
| 2014/0168525 | A1* | 6/2014 | Hasegawa | G03B 21/53 |
| | | | | 348/745 |
| 2016/0182873 | A1* | 6/2016 | Sumiyoshi | H04N 9/3185 |
| | | | | 348/747 |
| 2016/0227207 | A1* | 8/2016 | Lee | H04N 17/002 |
| 2018/0347962 | A1 | 12/2018 | Zhao et al. | |
| 2019/0146313 | A1* | 5/2019 | De La Cruz | H04N 9/3194 |
| | | | | 345/581 |
| 2019/0166339 | A1* | 5/2019 | De La Cruz | G06T 5/006 |
| 2019/0222744 | A1* | 7/2019 | Qin | G06T 3/0006 |
| 2019/0355104 | A1* | 11/2019 | Zhang | G06T 7/62 |
| 2019/0385285 | A1* | 12/2019 | Chen | G06T 5/006 |
| 2020/0098133 | A1* | 3/2020 | Chen | G06T 7/33 |

FOREIGN PATENT DOCUMENTS

| | | |
|---|---|---|
| CN | 101271357 A | 9/2008 |
| CN | 102714692 A | 10/2012 |
| CN | 104679001 A | 6/2015 |
| CN | 106152947 A | 11/2016 |

* cited by examiner

IMAGE PROCESSING METHOD AND APPARATUS

CROSS-REFERENCE TO RELATED APPLICATIONS

This application is a National Stage of International Application No. PCT/CN2016/111290, filed on Dec. 21, 2016, which is hereby incorporated by reference in its entirety.

TECHNICAL FIELD

Embodiments of the present invention relate to the field of image processing technologies, and in particular, to an image processing method and apparatus.

BACKGROUND

With continuous development of science and technologies, more intelligent devices such as smartphones and tablet computers are used in daily life. These intelligent devices usually have camera lenses, and can photograph planes having useful information, such as slides, whiteboards, and billboards, at any time. Therefore, labor and time-consuming recording is no longer required.

However, an image captured by using a camera lens is obtained through projection transformation. Therefore, the image may be distorted. FIG. 1a is a schematic diagram of imaging of a rectangular frame through photographing in the prior art. As shown in FIG. 1a, a point O is a location of a camera lens, and projection of a rectangular frame $P_1P_2P_3P_4$ on an image is a quadrangle $Q_1Q_2Q_3Q_4$. Two opposite sides of the quadrangle $Q_1Q_2Q_3Q_4$ are no longer parallel to each other, it cannot be ensured that an angle between two neighboring sides is 90°, and lengths of the two opposite sides are not equal to each other. This case is particularly obvious at a far end of the rectangular frame photographed by using the camera lens. The far end is a side of the rectangular frame that is relatively far away from the camera lens or an angle between two sides relatively far away from the camera lens. Image distortion caused by this case results in difficulty in seeing some useful information clearly. Therefore, the distorted quadrangular image captured by using the camera lens needs to be corrected, so that the quadrangle is still a rectangle in the image and an aspect ratio remains consistent with an aspect ratio of the rectangular frame in the real world. A correction process is shown in FIG. 1b. A quadrangle 101 in an image is corrected to a rectangle 102.

In the prior art, to facilitate effective correction of the quadrangular image, it needs to be first detected whether four edge lines of the quadrangle can form a rectangle in the real world. Condition for determining whether the four edge lines of the quadrangle detected in the image can form the rectangle in the real world include: an angle between directions of two opposite sides should fall within a range of 180°±30°, a distance between the two opposite sides needs to be greater than ⅕ of a width or a height of the image, an angle between two neighboring sides should fall within a range of ±90°±30°, and a perimeter of the quadrangle should be greater than ¼ of a sum of the width and the height of the image.

An erroneous detection case may exist when the foregoing determining conditions are used in the prior art. Several possible erroneous detection cases are shown in FIG. 2a to FIG. 2d. In FIG. 2a and FIG. 2b, an edge of a ruler that is unparallel to a longer side of a notebook is erroneously detected as a rectangular edge of the notebook. In FIG. 2c, an edge of a desk is erroneously detected as a rectangular edge of a notebook. In FIG. 2d, an edge inside rectangular edges of a book is erroneously detected as an edge of a cover of the book needing to be corrected.

An erroneous detection case exists in a rectangular frame detection and correction method in the prior art, it cannot be accurately determined whether a detected quadrangle is a distorted rectangle needing to be restored, and it cannot be ensured that a corrected rectangle is not distorted.

SUMMARY

Embodiments of the present invention provide an image processing method and apparatus, to accurately determine whether a detected quadrangle is a rectangle needing to be restored, and enable an aspect ratio of a corrected rectangle to be consistent with that of a rectangular frame in the real world.

A "photographed point" in the embodiments of the present invention is a point on a real object needing to be photographed. The real object needing to be photographed may be referred to as a "photographed object", and the "photographed point" may be understood as a point on the "photographed object".

A "first distance" in the embodiments of the present invention is a distance between the photographed point and a camera photographing the photographed point. A "second distance" is a distance between the photographed point and a first plane in which the camera photographing the photographed point is located, and the first plane is perpendicular to a principle axis of the camera photographing the photographed point. A "third distance" is a distance between one of four photographed points and a plane defined by the other three photographed points. It may be understood that the foregoing "first", "second", and "third" are merely used to distinguish between different distances and should not be understood as a limitation on different distances.

According to a first aspect, an embodiment of the present invention provides an image processing method. The method includes: detecting a first quadrangle in a first image, where the first quadrangle includes four vertexes, the four vertexes correspond to four photographed points, and the four vertexes are projected points of the four photographed points on the first image; determining distance information of the four photographed points relative to a camera capturing the first image; determining locations of the four photographed points based on the distance information of the four photographed points and location information of the points on the first image; and determining, based on the locations of the four photographed points, that the four photographed points are coplanar, where the four photographed points form a second quadrangle, determining a side ratio of two neighboring sides of the second quadrangle when a side angle and a side length relationship of the second quadrangle satisfy a preset condition, and correcting the first quadrangle to a rectangle, where two neighboring sides of the rectangle are in the side ratio.

Specifically, according to the image processing method provided in this embodiment of the present invention, the side ratio of the two neighboring sides of the quadrangle that is formed by the four photographed points and that satisfies a condition of a to-be-corrected rectangle is obtained based on the locations of the four photographed points corresponding to the vertexes of the quadrangle in the image. If the quadrangle satisfying the condition of the to-be-corrected rectangle is understood as a rectangle, the side ratio of the two neighboring sides may be understood as an aspect ratio of the rectangle. In this embodiment of the present invention, an actual aspect ratio of a photographed rectangle corresponding to the quadrangle in the image is calculated, to correct the quadrangle in the image to a rectangle having the aspect ratio. It can be ensured that the corrected rectangle is not distorted, and distortion caused by a difference between the aspect ratio of the corrected rectangular image and that of the original photographed rectangle is avoided.

In a possible implementation, an area or a perimeter of the first quadrangle is greater than a first threshold.

Specifically, the area or the perimeter of the first quadrangle is greater than ¼ of a total area of the image or ¼ of a sum of a width and a height of the image, to eliminate a quadrangle having a relatively small region, and prevent a small rectangular frame included in an original rectangular frame from being corrected to a real rectangular frame.

In a possible implementation, a first distance between each of the four photographed points and the camera capturing the first image is determined by using a depth sensor.

In a possible implementation, a second distance of each of the four photographed points is determined based on the first image and a second image. The second distance of each photographed point is a distance between the photographed point and a first plane, the first plane is a plane in which the camera capturing the first image is located, and the first plane is perpendicular to a principle axis of the camera capturing the first image. The second image includes projected points of the four photographed points on the second image, the principle axis of the camera capturing the first image is parallel to that of a camera capturing the second image, and the camera capturing the second image is located in the first plane.

In a possible implementation, the second distance of each photographed point is obtained based on coordinate information of each of the four vertexes on the first image, coordinate information of the projected point of the photographed point on the second image, a focal length of the camera capturing the first image, and a focal length of the camera capturing the second image.

In a possible implementation, three-dimensional coordinates of each photographed point in a three-dimensional coordinate system are determined based on the first distance of each of the four photographed points, two-dimensional coordinates of each of the four vertexes on the first image, two-dimensional coordinates of an intersecting point between a principle axis of the camera capturing the first image and a plane in which the first image is located, and a focal length of the camera capturing the first image.

In a possible implementation, three-dimensional coordinates of each photographed point in a three-dimensional coordinate system are determined based on the second distance of each of the four photographed points, two-dimensional coordinates of each of the four vertexes on the first image, two-dimensional coordinates of an intersecting point between the principle axis of the camera capturing the first image and a plane in which the first image is located, and the focal length of the camera capturing the first image.

In a possible implementation, a second plane in which three photographed points are located is determined based on locations of the three photographed points in the four photographed points, and a third distance between the photographed point other than the three photographed points in the four photographed points and the second plane is obtained. When the third distance is less than a second threshold, the four photographed points are coplanar.

In a possible implementation, the side ratio of the two neighboring sides of the second quadrangle is determined when the side angle and the side length relationship of the second quadrangle satisfy the preset condition. The preset condition includes one or more of the following: an absolute value of an angle between two opposite sides of the second quadrangle is less than a third threshold; an absolute value of a difference between a right angle and an angle between two neighboring sides of the second quadrangle is less than a fourth threshold; an absolute value of a difference between lengths of two opposite sides of the second quadrangle is less than a fifth threshold; and an absolute value of a difference between a distance between two opposite sides of the second quadrangle and a length of each of the other two sides is less than a sixth threshold.

Specifically, it may be determined, based on depth information of each photographed point, whether a shape on which projection imaging has not been performed and that corresponds to the quadrangle in the image is a to-be-corrected rectangle. Alternatively, it may be determined, based on the distance information of each photographed point relative to the plane in which the camera photographing the photographed point is located, whether a shape on which projection imaging has not been performed and that corresponds to the quadrangle in the image is a to-be-corrected rectangle. The plane is perpendicular to the principle axis of the camera. When the shape on which the projection imaging has not been performed and that corresponds to the quadrangle in the image satisfies the condition of the to-be-corrected rectangle, the quadrangle in the image is corrected to the rectangle. Accuracy of correcting a distorted rectangle in the image can be improved, and it is ensured that the corrected rectangle is not distorted. The shape on which the projection imaging has not been performed and that corresponds to the quadrangle in the image is a photographed object corresponding to the quadrangle.

According to a second aspect, an embodiment of the present invention provides an image processing apparatus. The apparatus includes: a camera lens, a processor, a depth sensor, and a display screen. The camera lens is configured to capture an image. The processor is configured to detect a first quadrangle in the image. The first quadrangle includes four vertexes, the four vertexes correspond to four photographed points, and the four vertexes are projected points of the four photographed points on the image. The depth sensor is configured to determine distance information of the four photographed points relative to the camera lens. The processor is configured to determine locations of the four photographed points based on the distance information of the four photographed points and location information of the points on the image. The processor is configured to: determine, based on the locations of the four photographed points, that the four photographed points are coplanar, where the four photographed points form a second quadrangle, determine a side ratio of two neighboring sides of the second quadrangle when a side angle and a side length relationship of the second quadrangle satisfy a preset condition, and correct the first quadrangle to a rectangle. Two neighboring sides of the rectangle are in the side ratio. The display screen is configured to display the rectangle.

In a possible implementation, the depth sensor is specifically configured to determine a first distance between each of the four photographed points and the camera lens.

In a possible implementation, the processor is specifically configured to determine three-dimensional coordinates of each photographed point in a three-dimensional coordinate system based on the first distance between each of the four photographed points and the camera lens, two-dimensional coordinates of each of the four vertexes on the image, two-dimensional coordinates of an intersecting point between a principle axis of the camera lens and the image, and a focal length of the camera lens.

In a possible implementation, the processor is specifically configured to determine, based on locations of three photographed points in the four photographed points, a plane in which the three photographed points are located, and obtain a third distance between the photographed point other than the three photographed points in the four photographed points and the plane, where when the third distance is less than a preset threshold, the four photographed points are coplanar.

According to a third aspect, an embodiment of the present invention provides an image processing apparatus. The apparatus includes: a first camera lens, a second camera lens, a processor, and a display screen. The first camera lens is configured to capture a first image. The processor is configured to detect a first quadrangle in the first image, where the first quadrangle includes four vertexes, the four vertexes correspond to four photographed points, and the four vertexes are projected points of the four photographed points on the first image. The second camera lens is configured to capture a second image, where the second image includes projected points of the four photographed points on the second image. The processor is configured to determine distance information of the four photographed points relative to the first camera lens and the second camera lens based on the first image and the second image. The processor is configured to determine locations of the four photographed points based on the distance information of the four photographed points relative to the first camera lens and the second camera lens and location information of the points on the first image. The processor is configured to: determine, based on the locations of the four photographed points, that the four photographed points are coplanar, where the four photographed points form a second quadrangle, determine a side ratio of two neighboring sides of the second quadrangle when a side angle and a side length relationship of the second quadrangle satisfy a preset condition, and correct the first quadrangle to a rectangle. Two neighboring sides of the rectangle are in the side ratio. The display screen is configured to display the rectangle.

In a possible implementation, the processor is specifically configured to determine a second distance of each of the four photographed points based on the first image and the second image. The second distance of each photographed point is a distance between the photographed point and a first plane in which the first camera lens is located and that is perpendicular to a principle axis of the first camera lens. The principle axis of the first camera lens is parallel to that of the second camera lens, and the second camera lens is located in the first plane.

In a possible implementation, the processor is specifically configured to obtain the second distance of each photographed point based on coordinate information of each of the four vertexes on the first image, coordinate information of the projected point of the photographed point on the second image, a focal length of the first camera lens, and a focal length of the second camera lens.

In a possible implementation, the processor is specifically configured to determine three-dimensional coordinates of each photographed point in a three-dimensional coordinate system based on the second distance of each of the four photographed points, two-dimensional coordinates of each of the four vertexes on the first image, two-dimensional coordinates of an intersecting point between the principle axis of the first camera lens and the first image, and the focal length of the first camera lens.

According to the image processing method and apparatus provided in the embodiments of the present invention, the locations of the photographed points are determined based on the distance information of the photographed points relative to the camera capturing the image and the location information of the projected points of the photographed points on the image. It is determined, based on the locations of the photographed points, whether the four photographed points corresponding to the four vertexes of the first quadrangle are coplanar. When the four photographed points are coplanar, the four photographed points form the second quadrangle. When the side angle and the side length relationship of the second quadrangle satisfy the preset condition, the side ratio of the two neighboring sides of the second quadrangle is determined, and the first quadrangle is corrected to the rectangle. The two neighboring sides of the rectangle are in the side ratio. In the embodiments of the present invention, a distorted rectangle in the image can be accurately corrected to an undistorted rectangle. According to the technical solutions provided in the embodiments of the present invention, correction accuracy of a rectangular frame in the image can be increased, and it is ensured that the corrected rectangular image is not distorted.

The foregoing and other aspects of the present invention will be clearer and easier to understand in descriptions of the following embodiments.

DETAILED DESCRIPTION OF ILLUSTRATIVE EMBODIMENTS

The following describes the embodiments of the present invention with reference to accompanying drawings.

An "edge line" in the embodiments of the present invention is a line including points whose grayscale values have a relatively large difference from those of surrounding pixels in an image. An "edge point" in the embodiments of the present invention is a point having a relatively large grayscale value change in one direction, or may be understood as a point located on the "edge line" in the image. A "feature point" in the embodiments of the present invention is a point that is located in a region having a severe grayscale change in the image and that is relatively easy both to be distinguished from a surrounding pixel point and to be detected, to be specific, a point having a relatively large grayscale value change in each direction, for example, a corner point of a rectangular frame in the image.

A "projected point" in the embodiments of the present invention is a point that corresponds to a "photographed point" and that is obtained through projection imaging on the image. In a device having a depth sensor and an optical camera in the embodiments of the present invention, the depth sensor may be integrated into the optical camera. In this case, the device may be understood as a camera having the depth sensor. No particular description is provided in this specification.

Figure 1A:
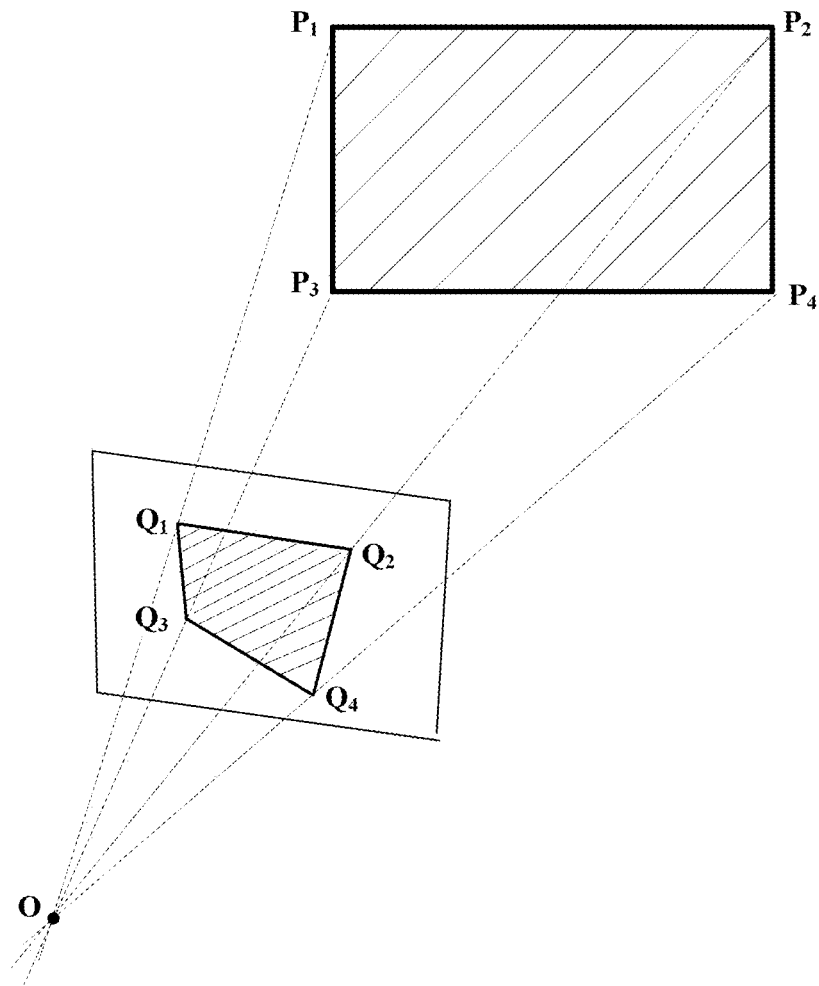
FIG. 1a is a schematic diagram of projection imaging of a rectangular frame.
Figure 1B:
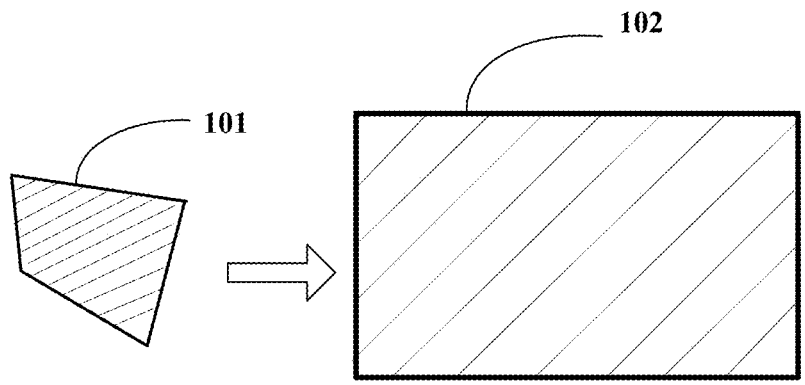
FIG. 1b is a schematic diagram of correction of a distorted rectangular frame.
Figure 2A:
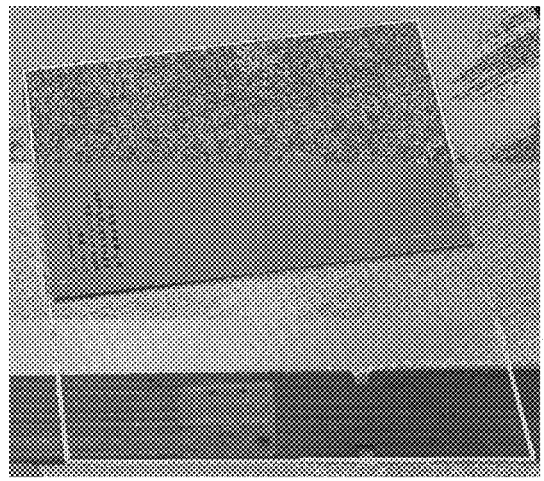
FIG. 2a is a schematic diagram of first erroneous detection occurring in the prior art.
Figure 2B:
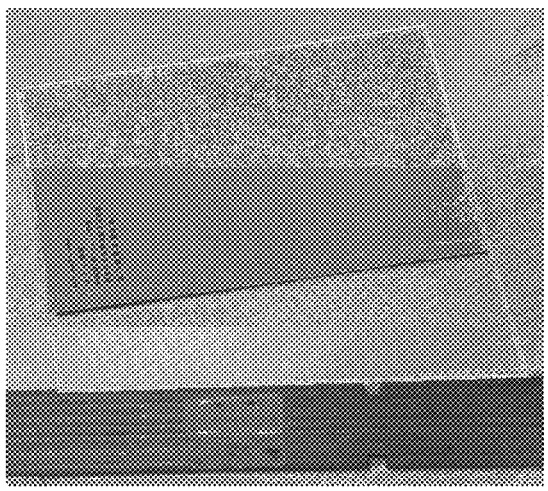
FIG. 2b is a schematic diagram of second erroneous detection occurring in the prior art.
Figure 2C:
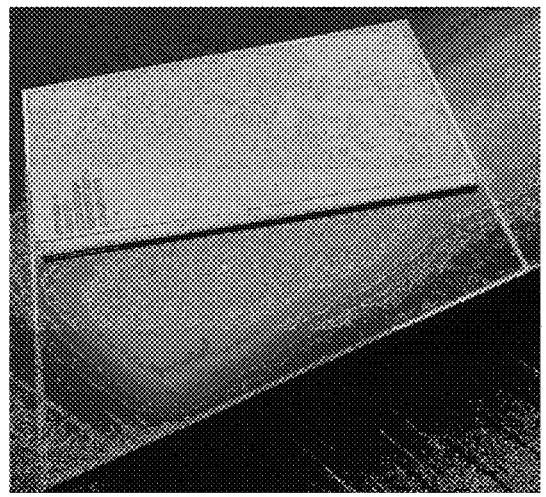
FIG. 2c is a schematic diagram of third erroneous detection occurring in the prior art.
Figure 2D:
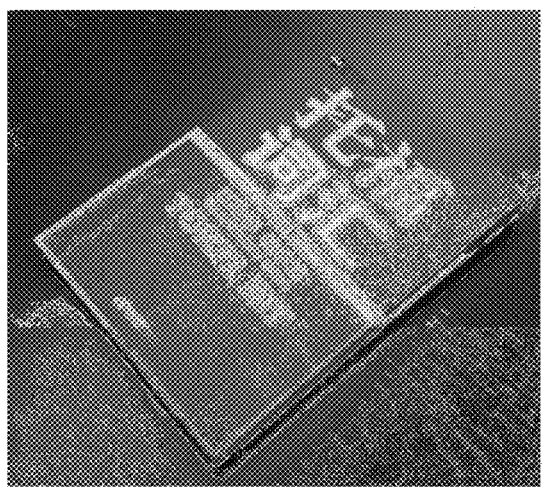
FIG. 2d is a schematic diagram of fourth erroneous detection occurring in the prior art.
Figure 3:
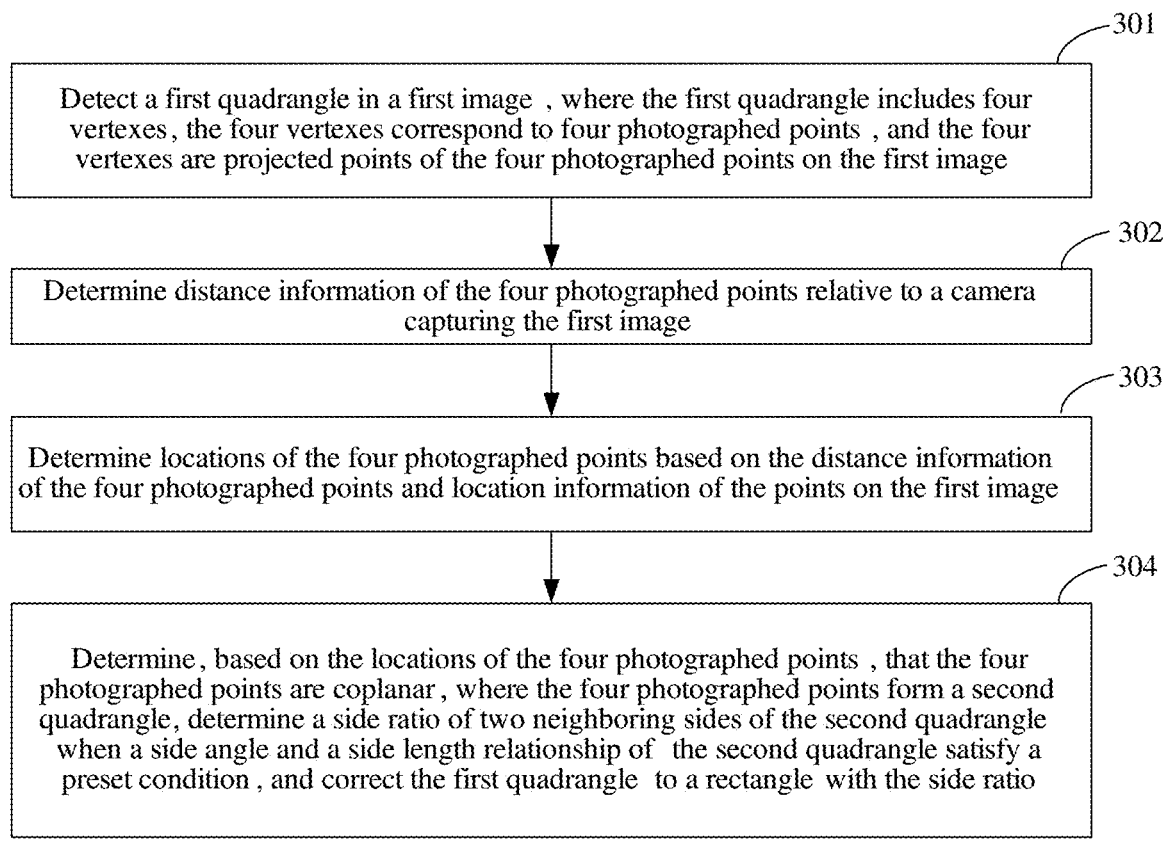
FIG. 3 is a schematic flowchart of an image processing method according to an embodiment of the present invention.

FIG. 3 is a schematic flowchart of an image processing method according to an embodiment of the present invention. In the method provided in this embodiment of the present invention, locations of four photographed points corresponding to four vertexes of a first quadrangle that is in an image and that is obtained through imaging of a photographed rectangular frame are obtained, to determine whether the four photographed points are coplanar. When the four photographed points are coplanar, four line segments defined by the four photographed points form a second quadrangle. It may be understood that the second quadrangle is a shape of a corresponding photographed object, namely, the rectangular frame.

Some determining conditions may be used to determine whether the four line segments of the second quadrangle can form a rectangle in the real world. In an ideal case, two opposite sides should be parallel to each other, an angle between two neighboring sides should be a right angle, lengths of the two opposite sides should be equal to each other, and a distance between the two opposite sides should be equal to lengths of the other two sides. However, considering impact of factors such as noise and an error in an actual engineering application, the determining conditions may be properly relaxed.

According to the image processing method provided in this embodiment of the present invention, it may be determined, based on the locations of the photographed points corresponding to the vertexes of the quadrangle that is in the image and that is obtained through imaging of the rectangular frame, whether the quadrangle formed when the photographed points corresponding to the vertexes of the quadrangle in the image are coplanar satisfies a condition of a to-be-corrected rectangle. If the quadrangle satisfies the condition of the to-be-corrected rectangle, a side ratio of two neighboring sides of the quadrangle formed when the photographed points are coplanar is calculated, and then the quadrangle in the image is corrected to a rectangle. Two neighboring sides of the rectangle are in the side ratio. A case in which the shape that is of the photographed object and that corresponds to the quadrangle in the image is not a rectangle can be avoided, and a case in which an aspect ratio (the side ratio) of the corrected rectangle is distorted relative to that of an original rectangular object can also be avoided. As shown in FIG. 3, the following steps are included.

Step 301: Detect the first quadrangle in a first image, where the first quadrangle includes the four vertexes, the four vertexes correspond to the four photographed points, and the four vertexes are projected points of the four photographed points on the first image.

Preferably, an area or a perimeter of the first quadrangle is greater than a first threshold.

The first threshold may be ¼ of an area or a sum of a width and a height of the image. To be specific, the area of the first quadrangle is greater than ¼ of the area of the image, and/or the perimeter of the first quadrangle is greater than ¼ of the sum of the width and the height of the image.

The first quadrangle in the first image may be detected by detecting edge lines in the first image. Specifically, the edge lines in the first image are detected, and any four edge lines are selected from the detected edge lines to form the first quadrangle on the first image. Specifically, step 301a and step 301b may be included.

Step 301a: Perform edge line detection on pixel points on the first image.

A point whose grayscale value has a relatively large difference from that of a surrounding pixel in the image is usually located in an edge region in the image, and each edge line in the image is defined by such points located on the edge line. A common edge detection algorithm includes Canny, Sobel, Prewitt, and the like.

Edge points on the image are detected, all edge lines are obtained through a Hough transform (Hough Transform), and candidate edge line segments are selected from all the edge lines. The candidate edge line segments form a set E.

Figure 4A:
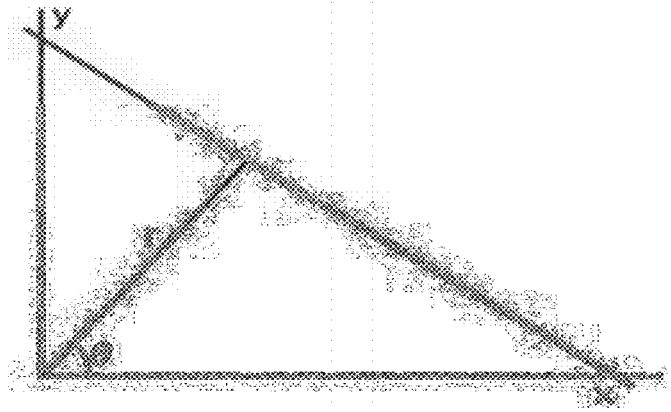
FIG. 4a is a schematic diagram of indicating a straight line by using (r, θ) in a Cartesian coordinate system.
Figure 4B:
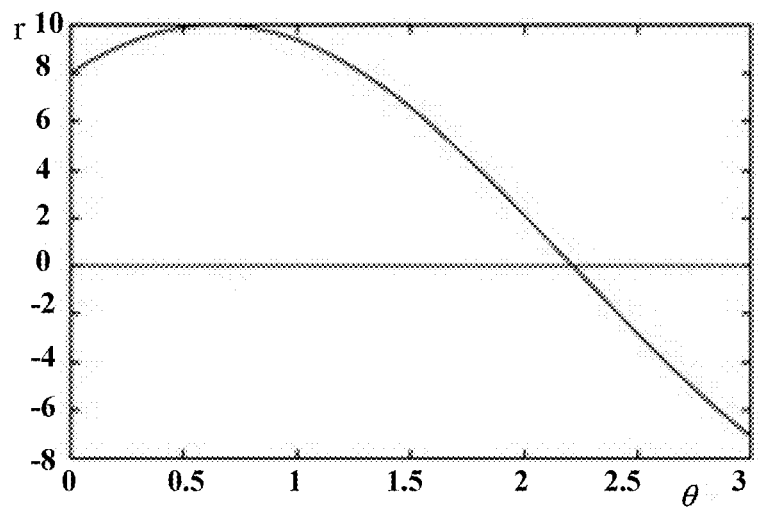
FIG. 4b is a schematic diagram of a curve that is in (r, θ) space and that corresponds to any point on a straight line indicated by using (r, θ) in a Cartesian coordinate system.
Figure 4C:
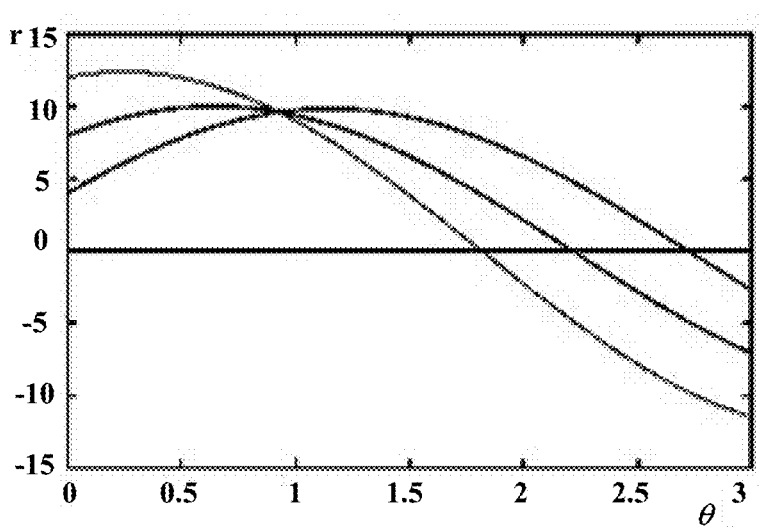
FIG. 4c is a schematic diagram of an intersecting point between curves in (r, θ) space that correspond to a plurality of points on a straight line indicated by using (r, θ) in a Cartesian coordinate system.

FIG. 4a to FIG. 4c show an edge line detection method according to an embodiment of the present invention. Details are as follows:

FIG. 4a is a schematic diagram of indicating a straight line by using (r, θ) in a Cartesian coordinate system. To be specific, in an xy-coordinate system, for any straight line, a line segment perpendicular to the straight line is drawn starting from an origin. Assuming that a distance between the origin and the straight line is r and an angle between the perpendicular line and an x-axis is θ, a relationship between any point (x, y) on the straight line and (r, θ) is shown in a formula (1):

$$r = x \cos \theta + y \sin \theta \qquad (1).$$

A Hough transform is performed on an edge point to obtain a curve, shown in FIG. 4b, that is in (r, θ) space and that corresponds to any point (x, y) on the straight line in the Cartesian coordinate system. A plurality of curves in the (r, θ) space that correspond to points on the same straight line in the Cartesian coordinate system intersect at a point, as shown in FIG. 4c. Therefore, a straight line in the Cartesian coordinate system corresponds to a point in the (r, θ) space.

The intersecting point of the plurality of curves shown in FIG. 4c is calculated. For each intersecting point, a quantity of curves intersecting at the point is denoted as N. A larger value of N indicates a longer corresponding line segment in the Cartesian coordinate system.

In an example, if $S(i)=N_i$, i=1, . . . , and n, and $N_i$ indicates a quantity of curves in the (r, θ) space that intersect at a point i (where i is a sequence number of the intersecting point in the (r, θ) space), values in a set S including all S(i) may be sorted in descending order, and k points satisfying a preset condition are selected, from the set S, as the candidate edge line segments that can form a rectangular frame. Reserved candidate edge line segments form the set E.

For example, the former 5% or 10% of the foregoing sorting result are selected, in other words, $$\frac{k}{n} < T.$$

T is a threshold, for example, 5% or 10%. For another example, a maximum value $S_{max}$ in the set S may be calculated, and edge line segments of $S(i) \geq S_{max}*T$ are reserved. T is a threshold, for example, 5% or 10%. It may be understood that the candidate edge line segments in the set E are relatively long edge line segments in all the edge line segments.

It should be noted that the foregoing straight line (or edge line) detection method performed through the Hough transform is only one of a plurality of detection methods, and a method such as linear fitting may alternatively be used for implementation. In addition, in an actual application, due to impact of factors such as noise and a detection error, an intersecting point between curves in the (r, θ) space that are of points collinear in the Cartesian coordinate system may be distributed within a range. Therefore, curves included in any small rectangular frame whose length and width are respectively $d_r$ and $d_\theta$ in the (r, θ) space are used as intersecting curves. Points in the Cartesian coordinate system that correspond to these curves may be considered as collinear. $d_r$ and $d_\theta$ are respectively a width value and a height value of the small rectangular frame in the (r, θ) space. In this case, linear fitting needs to be performed on the detected collinear points in the Cartesian coordinate system to obtain the linear equation.

Step 301b: Obtain the first quadrangle from an image edge line segment set.

Any four edge line segments are selected from the set E of the relatively long edge line segments. All possible combinations are calculated, four vertexes of a quadrangle formed by each combination are determined, and a quadrangle whose formed region is relatively small is eliminated.

Any four edge line segments $l_1$, $l_2$, $l_3$, and $l_4$ are selected from the set E, and a quadrangular region formed by the four edge line segments is determined. The four edge line segments may intersect with each other in pairs. Therefore, there is a maximum of six intersecting points among the four edge line segments, and four correct intersecting points need to be found out from the six intersecting points.

In an example, an angle between each of the four edge line segments and the x-axis is calculated. Assuming that the four angles are respectively $\alpha_1$, $\alpha_2$, $\alpha_3$, and $\alpha_4$, the four angles may be sorted; and after the sorting, line segments corresponding to the first two angles are two opposite sides, and line segments corresponding to the last two angles are two opposite sides. Assuming that four line segments sorted based on the angles are respectively $l_A$, $l_B$, $l_C$, and $l_D$, two intersecting points that are between $l_A$ and $l_C$ and between $l_A$ and $l_D$ and two intersecting points that are between $l_B$ and $l_C$ and between $l_B$ and $l_D$ may be separately calculated. A region V of the quadrangle formed by any four edge line segments selected from E may be determined hereto. The two intersecting points that are between $l_A$ and $l_C$ and between $l_A$ and $l_D$ and the two intersecting points that are between $l_B$ and $l_C$ and between $l_B$ and $l_D$ are four vertexes of the quadrangle V.

Preferably, the region V of the quadrangle formed by any four edge line segments selected from E needs to satisfy a preset condition, for example, whether an area or a perimeter of the region is greater than a threshold T. For example, the threshold T is ¼ of a total area of the image or ¼ of a sum of a width and a height of the image.

For the region V of the quadrangle formed by any four edge line segments selected from E, when the region V satisfies the preset condition (a first threshold), the quadrangle may be referred to as the first quadrangle.

Step 302: Determine distance information of the four photographed points relative to a camera capturing the first image.

Preferably, a first distance between each of the four photographed points and the camera capturing the first image is determined by using a depth sensor.

In an example, the first image may be obtained by using a device having the depth sensor and an optical camera. In an image processing process, depth information of the photographed point corresponding to the point in the first image is obtained by using the depth sensor. The depth information refers to a Euclidean distance, to be specific, a distance between the photographed point and the camera.

Specifically, the depth information of the photographed point may be set to d. To be specific, d is the first distance of the photographed point.

In an example, a camera three-dimensional coordinate system is set for the camera capturing the first image. In the three-dimensional coordinate system, it is assumed that an origin is O. In a coordinate system shown in FIG. 6 below, a z-axis is a principle axis, an image plane is perpendicular to the z-axis, and a distance between the image plane and the origin is a focal length f of the camera. Therefore, the first distance is a distance between the photographed point and the origin of the camera three-dimensional coordinate system.

Figure 6:
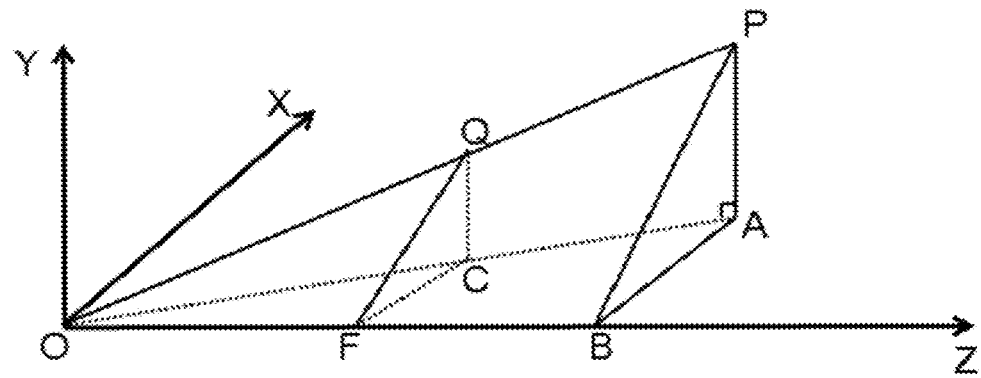
FIG. 6 is a schematic diagram of projection of a photographed point in a three-dimensional coordinate system.

It should be noted that, for the camera three-dimensional coordinate system, refer to detailed descriptions in FIG. 6.

It may be understood that in this embodiment of the present invention, the distance between the photographed point and the origin of the camera three-dimensional coordinate system represents the distance information of the photographed point relative to the camera. Specifically, the first distance may be the distance between the photographed point and the origin of the camera three-dimensional coordinate system. In the camera three-dimensional coordinate system, the principle axis of the camera may be selected as the z-axis.

Preferably, a second distance of each of the four photographed points is determined based on the first image and a second image. The second distance of each photographed point is a distance between the photographed point and a first plane that is perpendicular to the principle axis of the camera capturing the first image and that passes through an origin of a camera three-dimensional coordinate system, and the camera capturing the first image is located in the first plane.

The second image includes projected points of the four photographed points on the second image, a camera capturing the second image is located in the first plane, and the principle axis of the camera capturing the first image is parallel to that of the camera capturing the second image.

Specifically, the second distance of each photographed point is obtained based on coordinate information of each of the four vertexes on the first image, coordinate information of the projected point of the photographed point on the second image, a focal length of the camera capturing the first image, and a focal length of the camera capturing the second image.

In an example, first, two images may be obtained by using a stereo camera, and the two images are the first image and the second image. Second distances between photographed points corresponding to four vertexes on the image and a plane in which the two cameras are located and that is perpendicular to principle axes of the two cameras are obtained based on coordinates of matched feature pints in the two images, a distance between the two cameras in the stereo camera, and focal lengths of the cameras corresponding to the two images.

It should be noted that the stereo camera may be obtained through calibration of a binocular camera. Two camera lenses of the binocular camera may be vividly understood as "two eyes of a person". Therefore, the first distance of the photographed point may be understood as a distance between the photographed point and either of the eyes, and the second distance of the photographed point may be understood as a distance between the photographed point and a human face. A plane in which the human face is located is perpendicular to principle axes of the two eyes, and the human face includes the two eyes.

It should be noted that the vertex of the quadrangle in the image is a feature point. For example, four vertexes of a quadrangle obtained through projection of a rectangle are feature points. Feature point tracking is performed on the two images obtained by using the stereo camera. Matched feature points are two projected points of a same photographed point on the two images. A distance between the photographed point and the stereo camera may be obtained through the feature point tracking on the two images with reference to the focal lengths of the camera lenses of the stereo camera and distance information between the two camera lenses.

Specifically, the matched feature points on the two images are the projected points of the same photographed point on the two images. The matched feature points may be obtained though the feature point tracking. Specifically, a feature point on the image may be usually described by using a feature descriptor (Feature Descriptor) calculated by using a point in a surrounding region of the feature point. A relatively common feature descriptor is, for example, SIFT, SURF, and HoG. The feature descriptor is usually a vector. Feature points on different images are detected, and similarity (for example, a Euclidean distance) between descriptors of each pair of feature points is calculated, to determine whether two feature points are matched, thereby implementing tracking of the feature point on different frames of images.

Figure 5:
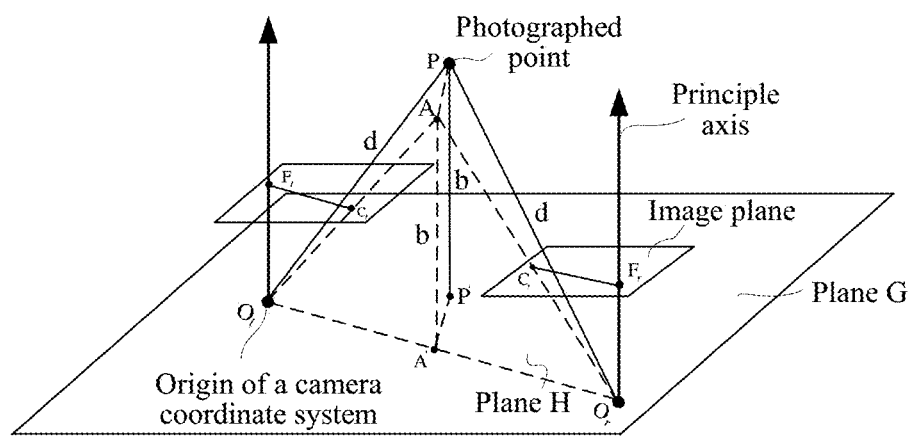
FIG. 5 is a schematic diagram of photographing of a stereo camera.

In this embodiment of the present invention, a second distance calculation method is provided with reference to FIG. 5.

FIG. 5 is a schematic diagram of photographing of a stereo camera. The stereo camera may be obtained through calibration of a binocular camera corresponding to origins $O_l$ and $O_r$ of two camera coordinate systems. $O_l$ and $O_r$ are origins of camera three-dimensional coordinate systems corresponding to two camera lenses of the stereo camera. Straight lines on which $O_l F_l$ and $O_r F_r$ are located are respectively directions of principle axes of the two camera lenses. Length values of line segments corresponding to $O_l F_l$ and $O_r F_r$ are focal lengths of the two camera lenses. Planes that respectively pass through a point $F_l$ and a point $F_r$ and that are perpendicular to the principle axes are respectively image planes of the two camera lenses. The principle axes of the two camera lenses are parallel to each other. P is a photographed point, a plane G is a plane perpendicular to the principle axes $O_l F_l$ and $O_r F_r$, and the origins $O_l$ and $O_r$ of the two camera coordinate systems are located in the plane G. Therefore, a distance d between the photographed point P and either of the origins $O_l$ and $O_r$ of the two camera coordinate systems is the first distance, and a distance b between the photographed point and the plane G is the second distance.

A perpendicular projected point of the photographed point P on the plane G is P', and $\|PP'\|=b$. To facilitate evaluation of b, a perpendicular line is drawn from the point P to a plane determined by the principle axes of the two cameras and intersects with the plane at a point A. The point A is connected to $O_l$ and $O_r$. In a triangle $O_l O_r A$, a perpendicular line AA' passing through the point A is drawn from the point to a straight line $O_l O_r$. The plane determined by the principle axes $O_l F_l$ and $O_r F_r$ of the two cameras is set to a plane H. The principle axes $O_l F_l$ and $O_r F_r$ are parallel to each other and both perpendicular to the plane G. Therefore, the plane H is perpendicular to G and intersects with the plane G at the straight line $O_l O_r$. Further, the straight line AA' is located in the plane H and is perpendicular to the straight line $O_l O_r$, and it may be learned that the straight line AA' is parallel to the principle axes $O_l F_l$ and $O_r F_r$. Therefore, the straight line AA' is perpendicular to the plane G. It may be learned based on the foregoing that the straight line AA' is parallel to a straight line PP' and is perpendicular to a straight line P'A'. Therefore, in a quadrangle PP'A'A, a straight line PA is parallel to the straight line P'A', and the straight line PP' is parallel to the straight line AA'. Therefore, the parallelogram PP'AA' is a rectangle. Therefore, $\|AA'\|=b$. The triangle $O_l O_r A$ intersects with the two image planes respectively at two points, namely, a point $C_l$ and a point $C_r$. It is assumed that $F_l C_l$ is a positive direction of the x-axis of an image plane of a left camera, and an x-coordinate of the point $C_l$ is $x_l$; and $C_r F_r$ is a positive direction of the x-axis of an image plane of a right camera, and an x-coordinate of the point $C_r$ is $x_r$.

Specifically, the line $O_l O_r$ connecting the origins of the two camera three-dimensional coordinate systems is parallel to the two image planes.

As shown in FIG. 5, the distance b between the point P and the plane G that passes through the origins of the two camera coordinate systems and that is perpendicular to the principle axes of the two cameras may be calculated by using a formula (2):

$$b = \frac{wf}{D}, \tag{2}$$

where w is a distance between the origins of the two camera coordinate systems, to be specific, a length of the line segment $O_l O_r$ is w, f is the focal lengths of the two cameras, and $D = x_l - x_r$.

Specifically, the point P is the photographed point corresponding to the point in the image, and the distance b between the point P and the plane that passes through the origins of the two camera coordinate systems and that is perpendicular to the principle axes of the two cameras is a second distance of the photographed point P.

In an actual application, when $x_l$ is already known, $x_r$ may be usually obtained by using a tracking algorithm such as a scale-invariant feature transform SIFT, Speeded Up Robust Features SURF, and a histogram of oriented gradient HoG.

It may be understood that in the binocular camera shown in FIG. 5, $O_l$ and $O_r$ are the origins of the two camera coordinate systems. To simplify subsequent calculation, the direction of the principle axis of the camera corresponding to $O_l$ or $O_r$ may be set to be the z-axis. Therefore, the second distance b is a z-axis coordinate of the photographed point.

Step 303: Determine locations of the four photographed points based on the distance information of the four photographed points and location information of the points on the first image.

Preferably, three-dimensional coordinates of each photographed point in a three-dimensional coordinate system are determined based on the first distance of each of the four photographed points, two-dimensional coordinates of each of the four vertexes on the first image, two-dimensional coordinates of an intersecting point between a principle axis of the camera capturing the first image and the first image, and a focal length of the camera capturing the first image.

Preferably, three-dimensional coordinates of each photographed point in a three-dimensional coordinate system are determined based on the second distances of the four photographed points, two-dimensional coordinates of each of the four vertexes on the first image, two-dimensional coordinates of an intersecting point between the principle axis of the camera capturing the first image and the first image, and the focal length of the camera capturing the first image.

A three-dimensional coordinate calculation method provided in this embodiment of the present invention is described below by using FIG. 6 as an example. This embodiment of the present invention provides two three-dimensional coordinate determining methods. The two methods may be classified into a three-dimensional coordinate calculation method for a camera having a depth sensor and a three-dimensional coordinate calculation method for a stereo camera.

The three-dimensional coordinate calculation method for a camera having a depth sensor may also be understood as calculating the three-dimensional coordinates by using the first distance. The three-dimensional coordinate calculation method for a stereo camera may also be understood as calculating the three-dimensional coordinates by using the second distance.

It should be noted that, the principle axis of the camera is used as the z-axis of the three-dimensional coordinates in this embodiment of the present invention. In addition, it may be understood that, to simplify the three-dimensional coordinate calculation method, an x-axis and a y-axis in the three-dimensional coordinate system may be respectively set to be parallel to an x-axis and a y-axis in the image plane and have a same direction with that of the x-axis and the y-axis in the image plane.

FIG. 6 is a schematic diagram of projection of a photographed point in a three-dimensional coordinate system. A direction of the z-axis in FIG. 6 corresponds to the direction of the principle axis of the camera in FIG. 5. As shown in FIG. 6, O is an origin of the camera three-dimensional coordinate system, the camera three-dimensional coordinate system is determined by the x-axis, the y-axis, and the x-axis, a straight line OZ is the principle axis (Principle Axis) of the camera, and F is an intersecting point between the principle axis and the image plane. P is any point (that is, the photographed point) in space, and Q is projection of the point P in the image plane.

A straight line PA is drawn from the point P to be perpendicular to a plane OXZ and to intersect with the plane OXZ at a point A, and a straight line AB is drawn passing through the point A to be parallel to the x-axis and to intersect with the z-axis at a point B. O and A are connected to intersect with the image plane at a point C. Therefore, a plane QCF is perpendicular to the z-axis. The z-axis is perpendicular to both the straight lines PA and AB that intersect with each other in a plane PAB. Therefore, the z-axis is perpendicular to the plane PAB. Therefore, a straight line PB is perpendicular to the z-axis. Further, the z-axis is perpendicular to the image plane QCF. Therefore, the z-axis is perpendicular to a straight line QF. In $\triangle$OPB, QF and PB are both perpendicular to OB. Therefore, QF and PB are parallel to each other. Similarly, the straight line OB is perpendicular to both the plane PAB and the plane QCF. Therefore, in $\triangle$OAB, a straight line CF is parallel to the straight line AB. Therefore, $$\frac{\|OC\|}{\|OA\|} = \frac{\|OF\|}{\|OB\|} = \frac{\|OQ\|}{\|OP\|} = k (k > O).$$

Further, $\triangle$OPA and $\triangle$OQC have a shared angle. Therefore, $\triangle$OPA and $\triangle$OQC are similar triangles. Therefore, a straight line QC is parallel to the straight line PA, to be specific, the straight line QC is perpendicular to the plane OXZ.

In FIG. 6, $\|OF\|=f$, f is the focal length of the camera. Coordinates of the point F and the point Q in a two-dimensional coordinate system of the image plane are set to $(u_o, v_o)$ and $(x_Q, y_Q)$. Assuming that the x-axis and the y-axis of the two-dimensional coordinate system of the image plane are parallel to the x-axis and the y-axis of a three-dimensional plane of the camera coordinate system and have same directions with those of the x-axis and the y-axis of the three-dimensional plane of the camera coordinate system, $\|FC\|=|u_o-x_Q|$, and $\|QC\|=|v_o-y_Q|$. It may be learned according to the Pythagorean theorem that $\|QF\|=\sqrt{\|FC\|^2+\|QC\|^2}$, and $\|OQ\|=\sqrt{\|OF^2\|+\|QF^2\|}=\sqrt{f^2+\|QF\|^2}$.

In an example, when a mobile device having the depth sensor and an optical camera is used for photographing, depth information $\|OP\|=d$ of the point P may be directly obtained by the depth sensor. Therefore, three-dimensional coordinates of the point P may be calculated according to a similar-triangle relationship, for example, as shown in a formula (3), a formula (4), and a formula (5):

$$P_x = \begin{cases} \dfrac{d*\|FC\|}{\|OQ\|} & \text{when } x_Q - u_O > 0 \\ -\dfrac{d*\|FC\|}{\|OQ\|} & \text{when } x_Q - u_O < 0 \end{cases} ; \quad (3)$$

$$P_y = \begin{cases} \dfrac{d*\|QC\|}{\|OQ\|} & \text{when } y_Q - v_O > 0 \\ -\dfrac{d*\|QC\|}{\|OQ\|} & \text{when } y_Q - v_O < 0 \end{cases} ; \quad (4)$$

and $$P_z = \|OB\| = \frac{d * f}{\|OQ\|}. \quad (5)$$

In another example, when the stereo camera is used for photographing, and in the three-dimensional coordinate system, the principle axis of the camera is used as the z-axis. Therefore, a distance between the photographed point P corresponding to the point Q and a plane that passes through two origins $O_l$ and $O_r$ of two camera coordinate systems and that is perpendicular to the principle axis is a z-axis coordinate of the point P. In other words, $\|OB\|=b$. b may be directly calculated by using the formula (2). Therefore, three-dimensional coordinates of the point P may be calculated according to a similar-triangle relationship, for example, as shown in a formula (6), a formula (7), and a formula (8):

$$P_x = \begin{cases} \frac{b * \|FC\|}{f} & \text{when } x_Q - u_O > 0 \\ -\frac{b * \|FC\|}{f} & \text{when } x_Q - u_O < 0 \end{cases} \quad (6)$$

$$P_y = \begin{cases} \frac{b * \|QC\|}{f} & \text{When } y_Q - v_O > 0 \\ -\frac{b * \|QC\|}{f} & \text{When } y_Q - v_O < 0 \end{cases} \quad (7)$$

and $$P_z = \|OB\| = b. \quad (8)$$

$P_x$, $P_y$, and $P_z$ are respectively an x-coordinate, a y-coordinate, and the z-coordinate of the photographed point P in the camera three-dimensional coordinate system.

It should be noted that in calculation processes performed by using the foregoing formula (2) to the formula (8), required information such as focal length data of the camera, distance data between the two cameras of the binocular camera, and an executed program related to image processing are all stored in a memory of a corresponding image processing apparatus. A processor of the image processing apparatus executes the data and the program that are stored in the memory of the image processing apparatus, to implement the method shown in FIG. 3.

Step 304: Determine, based on the locations of the four photographed points, that the four photographed points are coplanar, where the four photographed points form a second quadrangle, determine a side ratio of two neighboring sides of the second quadrangle when a side angle and a side length relationship of the second quadrangle satisfy a preset condition, and correct the first quadrangle to a rectangle, where two neighboring sides of the rectangle are in the side ratio.

Preferably, a plane in which three photographed points in the four photographed points are located is determined based on the locations of the three photographed points, and a third distance between the photographed point other than the three photographed points in the four photographed points and the plane is determined. When the third distance is less than a second threshold, the four photographed points are coplanar.

It should be noted that, considering a noise factor and an error factor in an actual engineering application, the second threshold needs to be set. For example, the second threshold may be 1 mm or 5 mm.

In an example, a method for determining whether the four vertexes are coplanar is: selecting any three points from the four vertexes, calculating an equation of a plane defined by the three points in the camera coordinate system, and then calculating a distance between the remaining point and the plane. If the distance is less than a threshold, it is considered that the four points are coplanar.

According to the image processing method provided in this embodiment of the present invention, it may be determined, based on the locations of the photographed points corresponding to the vertexes of the quadrangle in the image, whether the photographed points are coplanar. When it is determined that the photographed points corresponding to the vertexes of the quadrangle in the image are coplanar, the four photographed points form the second quadrangle. When the side angle and the side length relationship of the second quadrangle satisfy the preset condition, the first quadrangle in the image is corrected to the rectangle. Erroneous detection cases in FIG. 2*a*, FIG. 2*b*, FIG. 2*c*, and FIG. 2*d* can be eliminated. Correction accuracy of a distorted rectangular frame in an image in the prior art is increased.

Preferably, the preset condition includes one or more of the following: an absolute value of an angle between two opposite sides of the second quadrangle is less than a third threshold; an absolute value of a difference between a right angle and an angle between two neighboring sides of the second quadrangle is less than a fourth threshold; an absolute value of a difference between lengths of two opposite sides of the second quadrangle is less than a fifth threshold; and an absolute value of a difference between a distance between two opposite sides of the second quadrangle and a length of each of the other two sides is less than a sixth threshold.

In an example, a condition for whether the second quadrangle is a rectangle may be relaxed to satisfy one or more of the following conditions: the angle between the two opposite sides should fall within a range of $\pm T_1$, where $T_1$ is an angle, for example, 5° or 10°, that is greater than 0; the difference of the lengths of the two opposite sides should fall within a range of $\pm T_2$, where $T_2$ is a rational number greater than 0; the difference between the distance between the two opposite sides and the lengths of the other two sides should fall within a range of $\pm T_3$, where $T_3$ is a rational number greater than 0; and the angle between the two neighboring sides should fall within a range of $90°\pm T_4$, where $T_4$ is an angle, for example, 5° or 10°, that is greater than 0.

Specifically, when the side angle and the side length relationship of the second quadrangle satisfy the preset condition, the side ratio of the two neighboring sides of the second quadrangle is determined, and the first quadrangle is corrected to a rectangular image. The two neighboring sides of the rectangle are in the side ratio.

It may be understood that when the second quadrangle is a rectangle, the foregoing side ratio of the two neighboring sides is an aspect ratio of the rectangle.

According to the image processing method provided in this embodiment of the present invention, the side ratio of the two neighboring sides of the quadrangle that is formed by the four photographed points and that satisfies a condition of a to-be-corrected rectangle is obtained based on the locations of the four photographed points corresponding to the vertexes of the quadrangle in the image. If the quadrangle satisfying the condition of the to-be-corrected rectangle is understood as a rectangle, the side ratio of the two neighboring sides may be understood as the aspect ratio of the rectangle. In this embodiment of the present invention, an actual aspect ratio of a photographed rectangle corresponding to the quadrangle in the image is calculated, to correct the quadrangle in the image to a rectangle having the aspect ratio. It can be ensured that the corrected rectangle is not distorted, and distortion caused by a difference between the aspect ratio of the corrected rectangular image and that of the original photographed rectangle is avoided.

Figure 7A:
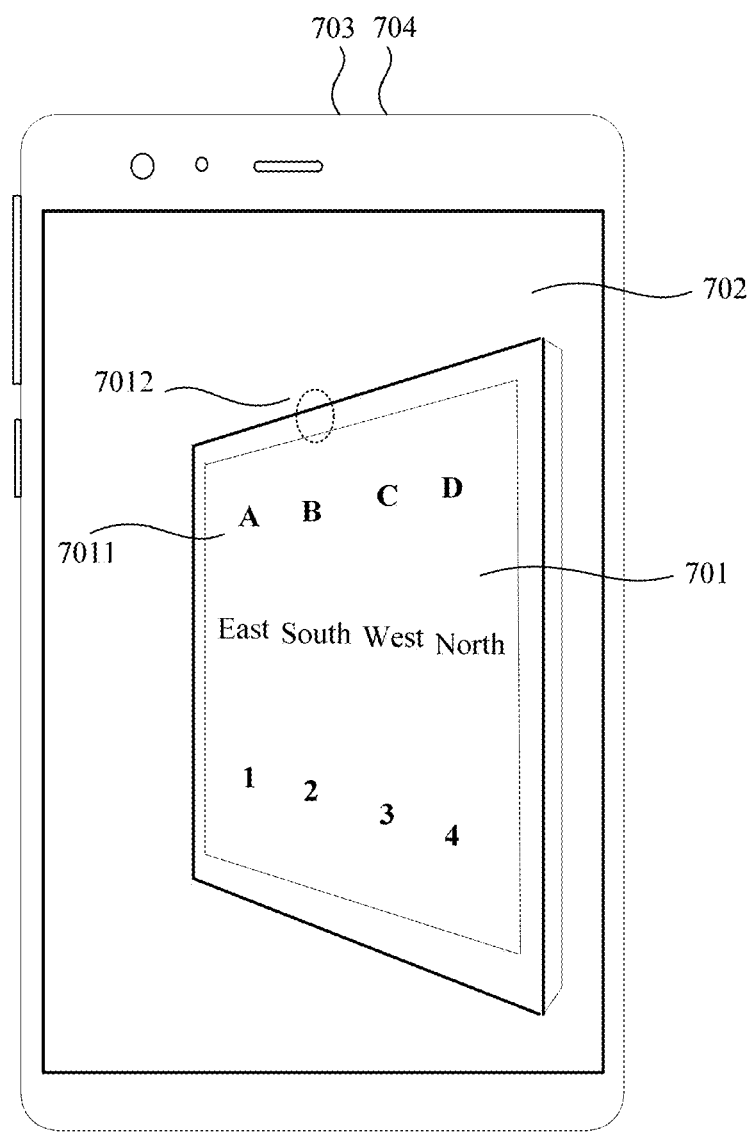
FIG. 7a is a schematic diagram of projection that is of a region including a rectangular frame in an image and that is obtained before correction.
Figure 7B:
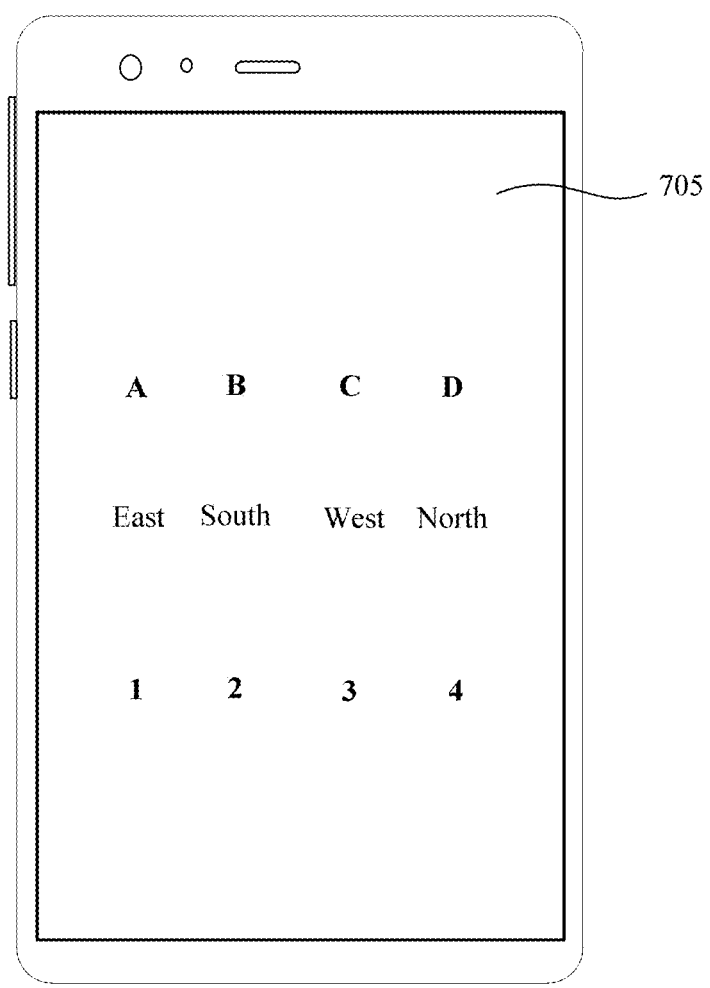
FIG. 7b is a schematic diagram of a corrected rectangular frame image.

FIG. 7a and FIG. 7b are a schematic diagram of comparison between an uncorrected image and a corrected image according to an embodiment of the present invention. Using a mobile phone terminal as an example, the mobile phone terminal includes a camera lens, a processor, and a display screen. FIG. 7a and FIG. 7b schematically show a display interface of the mobile phone terminal.

FIG. 7a is a schematic diagram of projection that is of a region including a rectangular frame in an image and that is obtained before correction. As shown in FIG. 7a, 701 is a quadrangle obtained through projection of a photographed rectangular frame in the real world in the image, and the quadrangle obtained through the projection is distorted. Two opposite sides of the quadrangle 701 are unparallel, and an angle between neighboring sides is not 90°. 7011 is projection of a region formed by the photographed rectangular frame in the image. The region includes useful information. A far end of the image of the photographed rectangular frame is severely distorted. Therefore, some useful information is caused to be fuzzy, to be specific, an imaging region corresponding to 7011 cannot be clearly seen. 7012 is an image of a bezel of the rectangular frame. 702 is the display interface of the terminal. In FIG. 7a, the display interface 702 displays a captured image. 703 and 704 are two rear-facing camera lenses. The image displayed in 702 may be captured by the two rear-facing camera lenses 703 and 704.

It should be noted that in another implementation of the present invention, a depth sensor is integrated into the terminal. In this case, only one of the shown rear-facing camera lenses 703 and 704 may be included. The processor in the terminal executes a related program in a memory, to complete a correction process of the rectangular frame image.

FIG. 7b is a schematic diagram of a corrected rectangular frame image. As shown in FIG. 7b, 705 is the schematic diagram of the corrected rectangular frame image. A part corresponding to 7011 of the corrected rectangular frame is displayed at an actual ratio, and information about the part may be clearly displayed.

It should be noted that after the rectangular frame is corrected, only a region inside the bezel is displayed. To be specific, a bezel part 7012 is not displayed.

Figure 8:
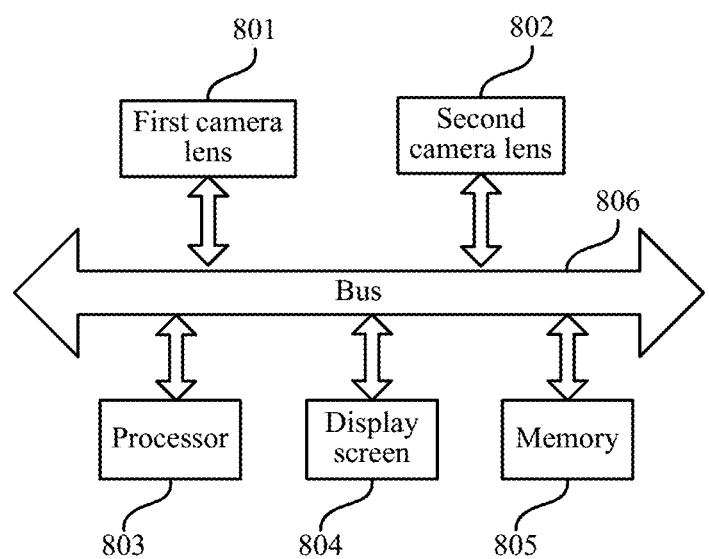
FIG. 8 is an architectural diagram of a first image processing apparatus according to an embodiment of the present invention.

FIG. 8 is an architectural diagram of a first image processing apparatus according to an embodiment of the present invention. As shown in FIG. 8, the first image processing apparatus includes: a first camera lens 801, a second camera lens 802, a processor 803, a display screen 804, a memory 805, and a bus 806.

According to the apparatus provided in this embodiment, images are captured by using the first camera lens 801 and the second camera lens 802. The first camera lens 801 and the second camera lens 802 may be integrated into one stereo camera. The memory 805 is configured to store a program and information such as focal lengths of the camera lenses. The first camera lens 801, the second camera lens 802, the processor 803, the display screen 804, and the memory 805 communicate with each other via the bus 806. During image processing, the processor 803 is configured to execute the program stored in the memory 805, so that the processor 803 performs steps of the method in the method embodiment in FIG. 3.

The memory 805 may be a storage apparatus, or may be a general term of a plurality of storage elements, and is configured to store information such as a program and data that are required for running a conferencing server. In addition, the memory 805 may include a combination of one or more of a random access memory (Random Access Memory, RAM for short), a flash memory, a read-only memory (Read Only Memory, ROM for short), an erasable programmable read-only memory (Erasable Programmable ROM, EPROM for short), an electrically erasable programmable read-only memory (Electrically EPROM, EEPROM for short), a register, a hard disk, a removable hard disk, a compact disc read-only memory (CD-ROM), a flash (Flash), or any form of storage medium well-known in the art.

The processor 803 may be a CPU, a general-purpose processor, a DSP, an application-specific integrated circuit (Application-Specific Integrated Circuit, ASIC for short), a field programmable gate array (Field Programmable Gate Array, FPGA) or another programmable logic device, a transistor logic device, a hardware component, or any combination thereof. The processor 803 may implement or execute various examples of logical blocks, units, and circuits described with reference to content disclosed in the present invention. Alternatively, the processor may be a combination of processors implementing a computing function, for example, a combination of one or more microprocessors, or a combination of the DSP and a microprocessor.

The bus 806 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The bus 806 may be classified into an address bus, a data bus, a control bus, and the like. For ease of representation, only one thick line is used to represent the bus in FIG. 8, but this does not mean that there is only one bus or only one type of bus.

In an example, the first camera lens 801 is configured to capture a first image.

The processor 803 is configured to detect a first quadrangle in the first image. The first quadrangle includes four vertexes, the four vertexes correspond to four photographed points, and the four vertexes are projected points of the four photographed points on the first image.

The second camera lens 802 is configured to capture a second image. The second image includes projected points of the four photographed points on the second image.

The processor 803 is configured to determine distance information of the four photographed points relative to the first camera lens 801 and the second camera lens 802 based on the first image and the second image.

The processor 803 is configured to determine locations of the four photographed points based on the distance information of the four photographed points relative to the first camera lens 801 and the second camera lens 802 and location information of the points on the first image.

The processor 803 is configured to: determine, based on the locations of the four photographed points, that the four photographed points are coplanar, where the four photographed points form a second quadrangle, determine a side ratio of two neighboring sides of the second quadrangle when a side angle and a side length relationship of the second quadrangle satisfy a preset condition, and correct the first quadrangle to a rectangle. Two neighboring sides of the rectangle are in the side ratio.

The display screen 804 is configured to display the rectangle.

Preferably, the processor 803 is specifically configured to determine a second distance of each of the four photographed points based on the first image and the second image. The second distance of each photographed point is a distance between the photographed point and a first plane in which the camera capturing the first image is located and that is perpendicular to a principle axis of the camera capturing the first image. The second image includes the projected points of the four photographed points on the second image, the principle axis of the camera capturing the first image is parallel to that of the camera capturing the second image, and the camera capturing the second image is located in the first plane.

Preferably, the processor 803 is specifically configured to obtain the second distance of each photographed point based on coordinate information of each of the four vertexes on the first image, coordinate information of the projected point of the photographed point on the second image, a focal length of the camera capturing the first image, and a focal length of the camera capturing the second image.

Preferably, the processor 803 is specifically configured to determine three-dimensional coordinates of each photographed point in a three-dimensional coordinate system based on the second distance of each of the four photographed points, two-dimensional coordinates of each of the four vertexes on the first image, two-dimensional coordinates of an intersecting point between the principle axis of the first camera lens and the first image, and the focal length of the first camera lens.

According to the image processing apparatus provided in this embodiment of the present invention, two images including quadrangles obtained through projection of a same photographed rectangle are obtained by using a camera including two camera lenses. The actual locations of the four photographed points of the quadrangle are obtained based on the distance information of the photographed points relative to the camera lenses and the location information of the points on the two images. It is determined, based on the actual locations of the four photographed points, whether the quadrangle included in either of the two images is corrected to a rectangle. In this embodiment of the present invention, when the four photographed points are coplanar and the quadrangle formed by the four photographed points satisfies the preset condition, the quadrangle obtained through projection of a rectangular frame in reality is corrected based on the side ratio of the neighboring sides of the quadrangle formed by the four photographed points. According to the technical solution provided in this embodiment of the present invention, correction accuracy of a rectangular frame in the image can be increased, and it is ensured that the corrected rectangular image is not distorted.

Figure 9:
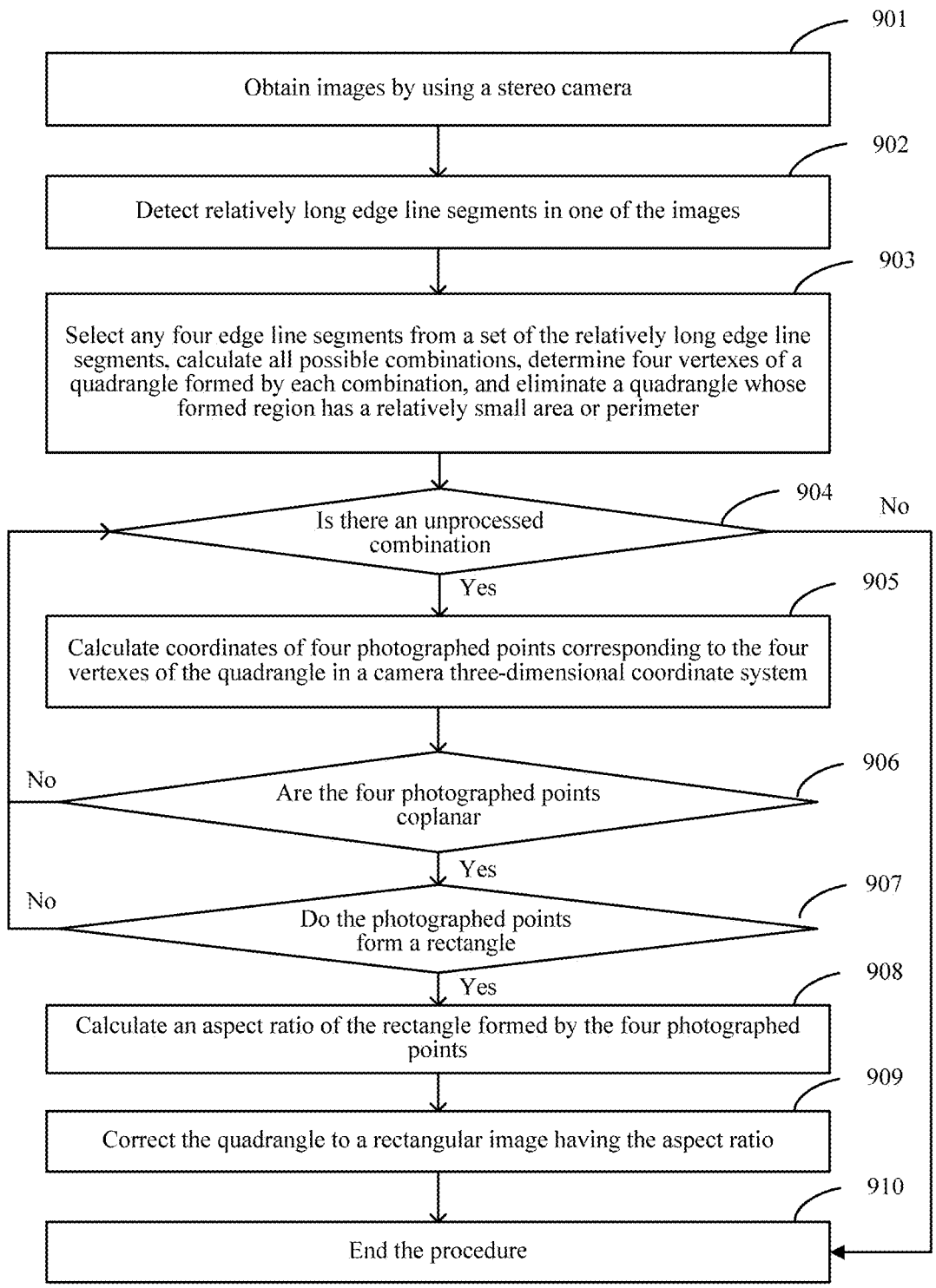
FIG. 9 is a schematic flowchart of an image processing method performed by using the apparatus shown in FIG. 8.

FIG. 9 is a schematic flowchart of an image processing method performed by using the apparatus shown in FIG. 8. In this embodiment, an example in which a rectangular frame is corrected by using a stereo camera is used. Two images including quadrangles obtained through imaging of a same photographed rectangle are obtained by using the stereo camera. Actual locations of photographed points corresponding to four vertexes are obtained based on distance information of the photographed points relative to the stereo camera and location information of points on the two images. It is determined, based on the actual locations of the four photographed points, whether the quadrangle included in either of the two images is corrected to a rectangle. As shown in FIG. 9, the following steps are included.

Step 901: Obtain the two images by using the stereo camera.

It should be noted that the stereo camera may be obtained through calibration of a binocular camera.

FIG. 5 may be referenced.

Step 902: Detect relatively long edge line segments in one of the two images.

The edge line detection has been described in step 3o1a, and details are not described herein.

Step 903: Select any four edge line segments from a set of the relatively long edge line segments, calculate all possible combinations, determine four vertexes of a quadrangle formed by each combination, and eliminate a quadrangle whose formed region has a relatively small area or perimeter.

The quadrangle selection has been described in step 301b, and details are not described herein.

Step 904: Determine whether there is an unprocessed combination.

It is determined whether all the possible combinations in the set of the relatively long edge line segments have been selected. If all the possible quadrangle combinations have been considered, perform step 910 to end the procedure. If there is still an unprocessed combination, perform step 905.

Step 905: Calculate coordinates of the photographed point corresponding to each of the four vertexes of the quadrangle in a camera three-dimensional coordinate system.

Distance information between the photographed points corresponding to the four vertexes of the quadrangle and the two cameras is obtained by using the binocular camera, and then the coordinates of the photographed points corresponding to the four vertexes of the quadrangle in the camera three-dimensional coordinate system are obtained based on the distance information and the location information of the points on the two images.

The distance information between the photographed points corresponding to the four vertexes of the quadrangle and the two cameras includes distances between the photographed points corresponding to the four vertexes and a plane that passes through origins of two camera coordinate systems and that is perpendicular to principle axes of the two cameras. The location information of the points on the two images includes: coordinates of projection of the photographed points corresponding to the four vertexes of the quadrangle in each of the two images, coordinates of intersecting points between the principle axes of the two cameras and the two images.

A specific three-dimensional coordinate calculation method has been described in the examples in step 302 and step 303, and details are not described herein.

Step 906: Determine whether the photographed points corresponding to the four vertexes are coplanar.

It is determined, based on the coordinates of the photographed points corresponding to the four vertexes in the camera three-dimensional coordinate system, whether the four corresponding photographed points are coplanar. If the four photographed points are not coplanar, perform step 904. If the four photographed points are coplanar, perform step 907.

Step 907: Determine whether the photographed points corresponding to the four vertexes form a rectangle.

It is determined, based on the coordinates of the photographed points corresponding to the four vertexes in the camera three-dimensional coordinate system, whether the photographed points corresponding to the four vertexes form a rectangle.

It should be noted that, determining whether a quadrangle formed by the photographed points corresponding to the four vertexes satisfies a preset condition is described in step 304. Therefore, the quadrangle that is formed by the photographed points corresponding to the four vertexes and that satisfies the preset condition may be understood as a rectangle.

If the four photographed points cannot form a rectangle, perform step 904. If the four photographed points form a rectangle, perform step 908.

Step 908: Calculate an aspect ratio of the rectangle formed by the photographed points corresponding to the four vertexes.

It should be noted that, determining whether the quadrangle formed by the four photographed points satisfies the preset condition is described in step 304. Therefore, the quadrangle that is formed by the four photographed points and that satisfies the preset condition may be understood as a rectangle, and a side ratio of neighboring sides of the quadrangle that is formed by the photographed points corresponding to the four vertexes and that satisfies the preset condition may be understood as an aspect ratio of the rectangle.

To ensure that a corrected rectangle is not distorted, an aspect ratio of a photographed rectangle corresponding to the quadrangle in the image may be calculated. The quadrangle obtained through imaging of a photographed rectangular frame in the image is then corrected based on the calculated aspect ratio.

Step 909: Correct the quadrangle to a rectangular image having the aspect ratio.

Step 910: End the procedure.

Figure 10:
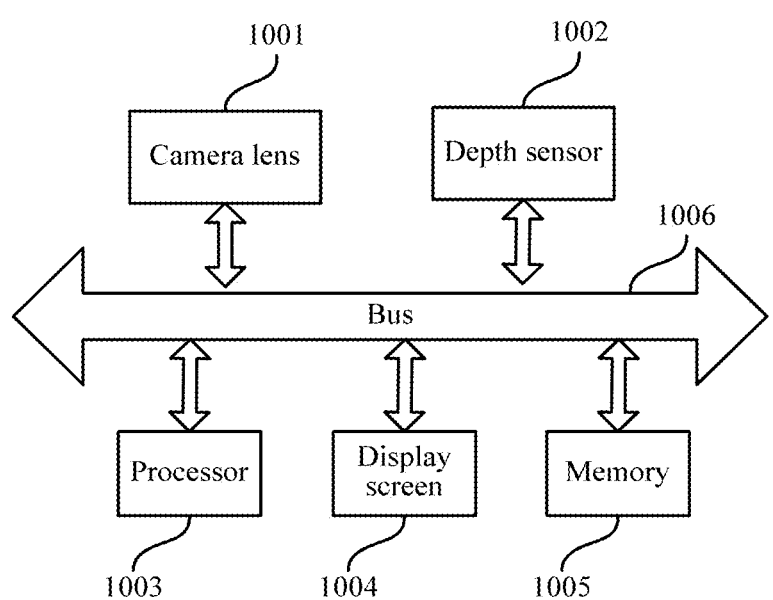
FIG. 10 is an architectural diagram of a second image processing apparatus according to an embodiment of the present invention.

FIG. 10 is an architectural diagram of a second image processing apparatus according to an embodiment of the present invention. As shown in FIG. 10, the second image processing apparatus includes: a camera lens 1001, a depth sensor 1002, a processor 1003, a display screen 1004, a memory 1005, and a bus 1006.

According to the apparatus provided in this embodiment, an image is captured by using the camera lens 1001. Depth information of photographed points is recorded by using the depth sensor 1002. The memory 1005 is configured to store a program and information such as a focal length of the camera lens. The first camera lens 1001, the depth sensor 1002, the processor 1003, the display screen 1004, and the memory 1005 communicate with each other via the bus 1006. During image processing, the processor 1003 is configured to execute the program stored in the memory 1005, so that the processor 1003 performs steps of the method in the method embodiment in FIG. 3.

For a connection relationship between the foregoing parts and functions of the parts, refer to the descriptions in FIG. 8, and details are not described herein again.

In an example, the camera lens 1001 is configured to capture an image. The processor 1003 is configured to detect a first quadrangle in the first image. The first quadrangle includes four vertexes, the four vertexes correspond to four photographed points, and the four vertexes are projected points of the four photographed points on the image. The depth sensor 1002 is configured to determine distance information of the four photographed points relative to the camera lens. The processor 1003 is configured to determine locations of the four photographed points based on the distance information of the four photographed points and location information of the points on the image. The processor 1003 is configured to: determine, based on the locations of the four photographed points, that the four photographed points are coplanar, where the four photographed points form a second quadrangle, determine a side ratio of two neighboring sides of the second quadrangle when a side angle and a side length relationship of the second quadrangle satisfy a preset condition, and correct the first quadrangle to a rectangle. Two neighboring sides of the rectangle are in the side ratio. The display screen 1004 is configured to display the rectangle.

Preferably, the depth sensor 1002 is specifically configured to determine a distance between each of the four photographed points and the camera lens. The distance between each photographed point and the camera lens may be denoted as a first distance of the photographed point, to correspond to the descriptions in the method embodiment in FIG. 3.

Preferably, the processor 1003 is specifically configured to determine three-dimensional coordinates of each photographed point in a three-dimensional coordinate system based on the distance of each of the four photographed points and the camera lens, two-dimensional coordinates of each of the four vertexes on the image, two-dimensional coordinates of an intersecting point between a principle axis of the camera lens and the image, and a focal length of the camera lens.

Preferably, the processor 1003 is specifically configured to determine, based on locations of three photographed points in the four photographed points, a plane in which the three photographed points are located, and obtain a distance between the photographed point other than the three photographed points in the four photographed points and the plane. When the distance between the photographed point other than the three photographed points and the plane is less than a preset threshold, the four photographed points are coplanar.

According to the image processing apparatus provided in this embodiment of the present invention, the image is obtained by using a mobile device having the depth sensor and an optical camera. The distance information of the four photographed points corresponding to the four vertexes of the quadrangle on the image is obtained by using the depth sensor, the actual locations of the four photographed points are obtained based on the distance information of the four photographed points and the location information of the points on the image, and it is determined, based on the actual locations of the four photographed points, whether the quadrangle included in the image is corrected to a rectangle. According to the technical solution provided in this embodiment of the present invention, correction accuracy of a rectangular frame in the image can be increased, and it is ensured that the corrected rectangular image is not distorted.

Figure 11:
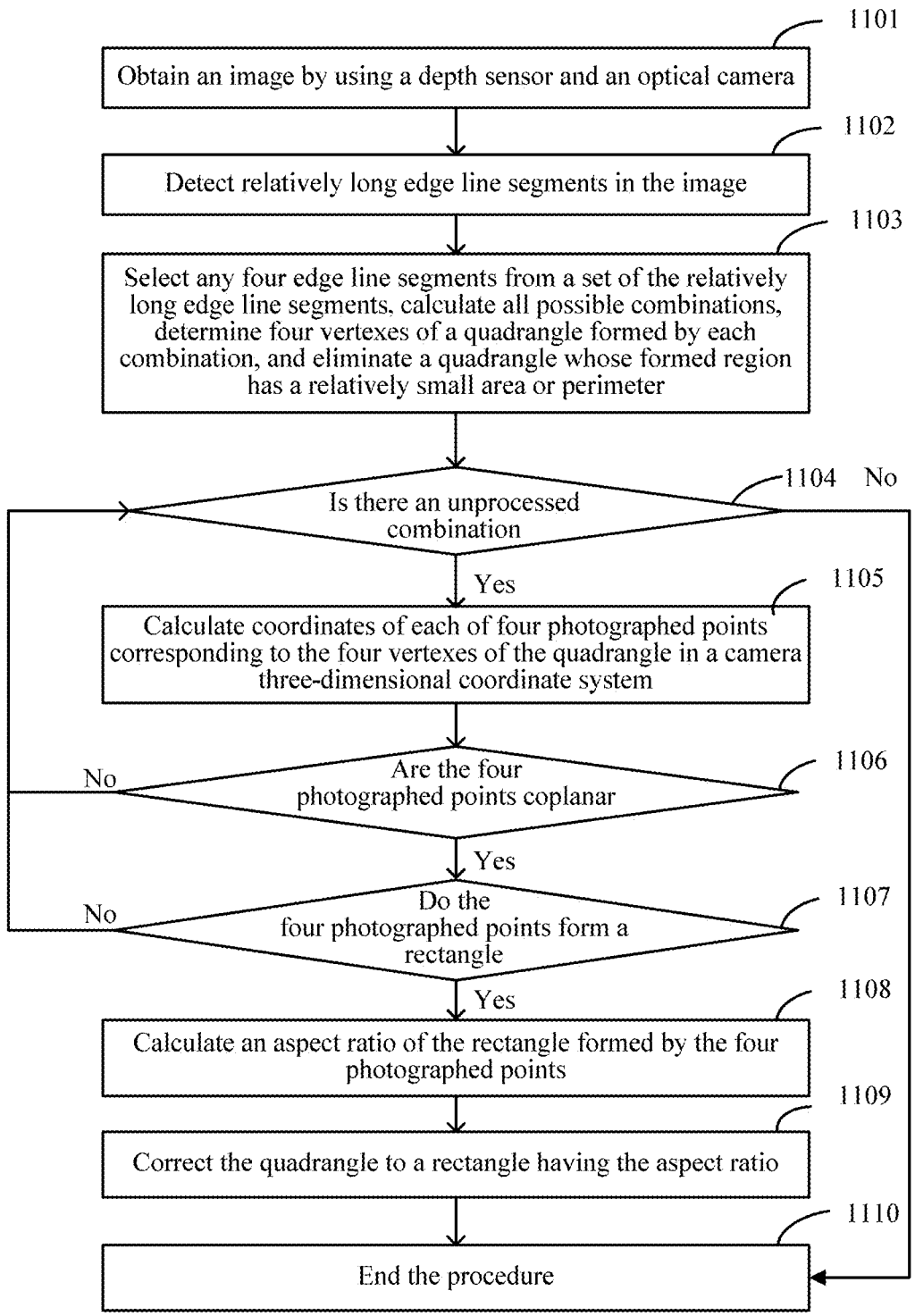
FIG. 11 is a schematic flowchart of an image processing method performed by using the apparatus shown in FIG. 10.

FIG. 11 is a schematic flowchart of an image processing method performed by using the apparatus shown in FIG. 10. In this embodiment, an example in which a rectangular frame is corrected by using a camera having a depth sensor is used. Distance information of photographed points corresponding to vertexes of a quadrangle on an image is obtained by using the depth sensor, actual locations of the photographed points corresponding to four vertexes of the quadrangle are obtained based on the distance information of the photographed points and location information of the points on the image, and it is determined, based on the actual locations of the four photographed points, whether the quadrangle included in the image is corrected to a rectangle. As shown in FIG. 11, the following steps are included.

Step 1101: Obtain the image by using the depth sensor and an optical camera.

Depth information of a photographed point corresponding to any point on the image, to be specific, a distance between the photographed point corresponding to any point and the camera capturing the image, is obtained by using the depth sensor.

Step 1102: Detect relatively long edge line segments in the image.

The edge line detection has been described in step 301a, and details are not described herein.

Step 1103: Select any four edge line segments from a set of the relatively long edge line segments, calculate all possible combinations, determine four vertexes of a quadrangle formed by each combination, and eliminate a quadrangle whose formed region has a relatively small area or perimeter.

The quadrangle selection has been described in step 301b, and details are not described herein.

Step 1104: Determine whether there is an unprocessed combination.

If there is still an unprocessed combination, perform step 1105. If there is no unprocessed combination, perform step 1110 to end the procedure.

Step 1105: Calculate coordinates of each of the four photographed points corresponding to the four vertexes of the quadrangle in a camera three-dimensional coordinate system.

A specific three-dimensional coordinate calculation method has been described in the examples in step 302 and step 303, and details are not described herein.

Step 1106: Determine whether the four photographed points are coplanar.

It is determined, based on the coordinates of the photographed points corresponding to the four vertexes in the camera three-dimensional coordinate system, whether the four corresponding photographed points are coplanar. If the four photographed points are coplanar, perform step 1107. If the four photographed points are not coplanar, perform step 1104.

Step 1107: Determine whether the four photographed points form a rectangle.

It is determined, based on the coordinates of the photographed points corresponding to the four vertexes in the camera three-dimensional coordinate system, whether the photographed points corresponding to the four vertexes form a rectangle.

It should be noted determining whether a quadrangle formed by the photographed points corresponding to the four vertexes satisfies a preset condition is described in step 304. Therefore, the quadrangle that is formed by the photographed points corresponding to the four vertexes and that satisfies the preset condition may be understood as a rectangle.

If the four photographed points form a rectangle, perform step 1108. If the four photographed points cannot form a rectangle, perform step 1104.

Step 1108: Calculate an aspect ratio of the rectangle formed by the four photographed points.

It should be noted that determining whether the quadrangle formed by the four photographed points satisfies the preset condition is described in step 304. Therefore, the quadrangle that is formed by the four photographed points and that satisfies the preset condition may be understood as a rectangle, and a side ratio of neighboring sides of the quadrangle that is formed by the photographed points corresponding to the four vertexes and that satisfies the preset condition may be understood as an aspect ratio of the rectangle.

To ensure that a corrected rectangle is not distorted, an aspect ratio of a photographed rectangle corresponding to the quadrangle in the image may be calculated. The quadrangle obtained through imaging of a photographed rectangular frame in the image is then corrected based on the calculated aspect ratio.

Step 1109: Correct the quadrangle to a rectangular image having the aspect ratio.

Step 1110: End the procedure.

According to the image processing method provided in this embodiment of the present invention, the locations of the photographed points corresponding to the four vertexes of the quadrangle are determined based on the location information of the quadrangle in the image and the distance information between a photographed object and the camera capturing the image. When the locations of the photographed points and the quadrangle formed by the four photographed points satisfy preset conditions, the quadrangle in the image is corrected to the rectangle based on the locations of the four photographed points. In this embodiment of the present invention, the quadrangle obtained through projection of the rectangular frame in reality is corrected based on the side ratio of the quadrangle formed by the four photographed points, so that correction accuracy of the rectangular frame in the image can be increased, and it is ensured that the corrected rectangular image is not distorted.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or a part of the steps in each of the foregoing method of the embodiments may be implemented by a program instructing a processor. The program may be stored in a computer-readable storage medium. The storage medium is a non-transitory (English: non-transitory) medium, for example, a random access memory, a read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely some illustrative examples of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   detecting a first quadrangle in a first image, wherein the first quadrangle comprises four vertexes, the four vertexes correspond to four photographed points, and the four vertexes are projected points of the four photographed points on the first image;
   determining distance information of each of the four photographed points relative to a camera capturing the first image;
   determining locations of the four photographed points based on the distance information of each of the four photographed points and location information of the four vertexes on the first image;
   determining, based on the locations of the four photographed points, that the four photographed points are coplanar with each other, wherein the four photographed points form a second quadrangle;
   when a side angle and a side length relationship of the second quadrangle satisfy a preset condition, determining a side ratio of two neighboring sides of the second quadrangle; and
   correcting the first quadrangle to a rectangle, wherein two neighboring sides of the rectangle are in the side ratio.

2. The method according to claim 1, further comprising:
   determining that an area of the first quadrangle is greater than a first threshold.

3. The method according to claim 1, further comprising:
   determining that a perimeter of the first quadrangle is greater than a first threshold.

4. The method according to claim 1, wherein determining the distance information of each of the four photographed points relative to the camera capturing the first image comprises:
   for each of the four photographed points, determining, using a depth sensor, a respective first distance between the respective photographed point and the camera capturing the first image.

5. The method according to claim 4, wherein determining the locations of the four photographed points based on the distance information of each of the four photographed points and the location information of the vertexes on the first image comprises:
   determining three-dimensional coordinates of each photographed point of the four photographed points in a three-dimensional coordinate system, wherein the three-dimensional coordinates are determined based on the first distance of each of the four photographed points, two-dimensional coordinates of each of the four vertexes on the first image, two-dimensional coordinates of an intersecting point between a principle axis of the camera capturing the first image and a plane in which the first image is located, and a focal length of the camera capturing the first image.

6. The method according to claim 1, wherein determining the distance information of each of the four photographed points relative to the camera capturing the first image comprises:
   determining a second distance of each of the four photographed points based on the first image and a second image, wherein the respective second distance of each photographed point of the four photographed points is a distance between the respective photographed point and a first plane, the first plane is a plane in which the camera capturing the first image is located, and the first plane is perpendicular to a principle axis of the camera capturing the first image; and
   wherein the second image comprises projected points of the four photographed points on the second image, the principle axis of the camera capturing the first image is parallel to that of a camera capturing the second image, and the camera capturing the second image is located in the first plane.

7. The method according to claim 6, wherein determining the second distance of each of the four photographed points based on the first image and the second image comprises:
   obtaining the second distance of each of the four photographed points based on coordinate information of each of the four vertexes on the first image, coordinate information of the respective projected point of the photographed point on the second image, a focal length of the camera capturing the first image, and a focal length of the camera capturing the second image.

8. The method according to claim 6, wherein determining the locations of the four photographed points based on the distance information of each of the four photographed points and location information of the vertexes on the first image comprises:
   determining three-dimensional coordinates of each photographed point in a three-dimensional coordinate system based on the second distance of each of the four photographed points, two-dimensional coordinates of each of the four vertexes on the first image, two-dimensional coordinates of an intersecting point between the principle axis of the camera capturing the first image and a plane in which the first image is located, and a focal length of the camera capturing the first image.

9. The method according to claim 1, wherein determining, based on the locations of the four photographed points, that the four photographed points are coplanar with each other comprises:
   determining, based on locations of three photographed points of the four photographed points, a second plane in which the three photographed points are located;
   obtaining a third distance between the photographed point other than the three photographed points of the four photographed points and the second plane; and
   when the third distance is less than a second threshold, determining that the four photographed points are coplanar.

10. The method according to claim 1, wherein the preset condition comprises:
    an absolute value of an angle between two opposite sides of the second quadrangle is less than a third threshold;
    an absolute value of a difference between a right angle and an angle between two neighboring sides of the second quadrangle is less than a fourth threshold;
    an absolute value of a difference between lengths of two opposite sides of the second quadrangle is less than a fifth threshold; and
    an absolute value of a difference between a distance between two opposite sides of the second quadrangle and a length of each of the other two sides is less than a sixth threshold.

11. An apparatus, comprising:
    a camera, configured to capture an image;
    a processor, configured to detect a first quadrangle in the image, wherein the first quadrangle comprises four vertexes, the four vertexes correspond to four photographed points, and the four vertexes are projected points of the four photographed points on the image;

a depth sensor, configured to determine distance information of each of the four photographed points relative to the camera; and a display screen;

wherein the processor is further configured to:

determine locations of the four photographed points based on the distance information of each of the four photographed points and location information of the four vertexes on the image;

determine, based on the locations of the four photographed points, that the four photographed points are coplanar with each other, wherein the four photographed points form a second quadrangle;

when a side angle and a side length relationship of the second quadrangle satisfy a preset condition, determine a side ratio of two neighboring sides of the second quadrangle; and correct the first quadrangle to a rectangle, wherein two neighboring sides of the rectangle are in the side ratio; and wherein the display screen is configured to display the rectangle.

12. The apparatus according to claim 11, wherein the depth sensor is further configured to:

determine a first distance between each of the four photographed points and the camera.

13. The apparatus according to claim 12, wherein the processor is further configured to determine three-dimensional coordinates of each photographed point of the four photographed point in a three-dimensional coordinate system, wherein the three-dimensional coordinates of each photographed point of the four photographed point are determined based on the first distance between each of the four photographed points and the camera, two-dimensional coordinates of each of the four vertexes on the image, two-dimensional coordinates of an intersecting point between a principle axis of the camera and a plane in which the image is located, and a focal length of the camera.

14. The apparatus according claim 11, wherein the processor is further configured to:

determine, based on locations of three photographed points in the four photographed points, a plane in which the three photographed points are located;

obtain a third distance between the photographed point other than the three photographed points in the four photographed points and the plane; and when the third distance is less than a preset threshold, determining that the four photographed points are coplanar with each other.

15. An apparatus, comprising:

a first camera, configured to capture a first image;

a processor, configured to detect a first quadrangle in the first image, wherein the first quadrangle comprises four vertexes, the four vertexes correspond to four photographed points, and the four vertexes are projected points of the four photographed points on the first image;

a second camera, configured to capture a second image, wherein the second image comprises projected points of the four photographed points on the second image; and a display screen;

wherein the processor is further configured to:

determine distance information of each of the four photographed points relative to the first camera and the second camera based on the first image and the second image;

determine locations of the four photographed points based on the distance information of each of the four photographed points relative to the first camera and the second camera and location information of the four vertexes on the first image;

determine, based on the locations of the four photographed points, that the four photographed points are coplanar with each other, wherein the four photographed points form a second quadrangle;

when a side angle and a side length relationship of the second quadrangle satisfy a preset condition, determine a side ratio of two neighboring sides of the second quadrangle; and correct the first quadrangle to a rectangle, wherein two neighboring sides of the rectangle are in the side ratio; and wherein the display screen is configured to display the rectangle.

16. The apparatus according to claim 15, wherein the processor is further configured to:

determine a second distance of each of the four photographed points based on the first image and the second image, wherein the second distance of each of the four photographed points is a distance between the respective photographed point of the four photographed points and a first plane, the first plane is a plane in which the first camera is located, and the first plane is perpendicular to a principle axis of the first camera; and wherein the principle axis of the first camera is parallel to a principle axis of the second camera, and the second camera is located in the first plane.

17. The apparatus according to claim 16, wherein the processor is further configured to:

obtain the second distance of each of the four photographed points based on coordinate information of each of the four vertexes on the first image, coordinate information of the respective projected point of the photographed point on the second image, a focal length of the first camera, and a focal length of the second camera.

18. The apparatus according to claim 16, wherein the processor is further configured to:

determine three-dimensional coordinates of each photographed point of the four photographed points in a three-dimensional coordinate system based on the second distance of each of the four photographed points, two-dimensional coordinates of each of the four vertexes on the first image, two-dimensional coordinates of an intersecting point between the principle axis of the first camera and a plane in which the first image is located, and a focal length of the first camera.

* * * * *